(12) United States Patent
Sethuraman

(10) Patent No.: US 11,182,298 B2
(45) Date of Patent: Nov. 23, 2021

(54) SYSTEM, APPARATUS AND METHOD FOR DYNAMIC PROFILING IN A PROCESSOR

(71) Applicant: Intel Corporation, Santa Clara, CA (US)

(72) Inventor: Ramanathan Sethuraman, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 303 days.

(21) Appl. No.: 16/384,095

(22) Filed: Apr. 15, 2019

(65) Prior Publication Data

US 2019/0243769 A1    Aug. 8, 2019

Related U.S. Application Data

(62) Division of application No. 15/373,682, filed on Dec. 9, 2016, now Pat. No. 10,296,464.

(51) Int. Cl.
*G06F 12/0875* (2016.01)
*G06F 12/0891* (2016.01)
(Continued)

(52) U.S. Cl.
CPC ...... *G06F 12/0875* (2013.01); *G06F 9/30021* (2013.01); *G06F 9/30145* (2013.01);
(Continued)

(58) Field of Classification Search
CPC .............. G06F 3/00; G06F 3/06–0689; G06F 7/00–785; G06F 9/00–30021; G06F 9/30025–30145; G06F 9/30149–548; G06F 11/00–3696; G06F 12/00–16; G06F 2003/0691–0698; G06F 2009/45562–45595; G06F 2201/00–885;
(Continued)

(56) References Cited

U.S. PATENT DOCUMENTS 5,127,103 A    6/1992 Hill
5,212,728 A    5/1993 Glover
(Continued)

FOREIGN PATENT DOCUMENTS

WO    2013147896    10/2013
WO    WO2014133520    9/2014

OTHER PUBLICATIONS

M. Collin and M. Brorsson, "Low power instruction fetch using profiled variable length instructions," IEEE International [Systems-on-Chip] SOC Conference, 2003. Proceedings., 2003, pp. 183-188 (Year: 2003).*
(Continued)

*Primary Examiner* — Daniel C. Chappell
(74) *Attorney, Agent, or Firm* — Trop, Pruner & Hu, PC

(57) ABSTRACT

In one embodiment, an apparatus includes: a storage having a plurality of entries each to store address information of an instruction and a count value of a number of executions of the instruction during execution of code including the instruction; and at least one comparator circuit to compare a count value from one of the plurality of entries to a threshold value, where the instruction is a tagged instruction of the code, the tagged instruction tagged by a static compiler prior to execution of the code. Other embodiments are described and claimed.

20 Claims, 15 Drawing Sheets

(51) Int. Cl.
  *G06F 12/0842* (2016.01)
  *G06F 11/34* (2006.01)
  *G06F 9/30* (2018.01)

(52) U.S. Cl.
  CPC .......... *G06F 11/34* (2013.01); *G06F 12/0842* (2013.01); *G06F 12/0891* (2013.01); *G06F 2212/452* (2013.01); *G06F 2212/62* (2013.01); *Y02D 10/00* (2018.01)

(58) Field of Classification Search
  CPC ........ G06F 2206/00–20; G06F 2207/00–7295; G06F 2209/00–549; G06F 2211/00–902; G06F 2212/00–7211; G06F 2213/00–0064; G06F 2216/00–17; G06F 2221/00–2153
  See application file for complete search history.

(56) References Cited

U.S. PATENT DOCUMENTS

| | | | |
|---|---|---|---|
| 6,044,478 A * | 3/2000 | Green | G06F 12/0815 711/141 |
| 6,205,545 B1 | 3/2001 | Shah | |
| 6,233,678 B1 | 5/2001 | Bala | |
| 6,311,324 B1 | 10/2001 | Smith | |
| 6,606,721 B1 | 8/2003 | Gowin | |
| 7,774,590 B2 | 8/2010 | Borkar | |
| 8,205,200 B2 | 6/2012 | Liao | |
| 8,443,171 B2 | 5/2013 | Morris | |
| 8,572,295 B1 | 10/2013 | Cai et al. | |
| 8,612,832 B2 | 12/2013 | McGinnis | |
| 8,756,461 B1 | 6/2014 | Jacob | |
| 9,009,448 B2 | 4/2015 | Ruehle | |
| 9,063,730 B2 | 6/2015 | Digh | |
| 9,405,647 B2 | 8/2016 | Vera | |
| 10,108,424 B2 | 10/2018 | Tuck | |
| 2002/0087949 A1 | 7/2002 | Golender | |
| 2002/0129309 A1 | 9/2002 | Floyd | |
| 2002/0138753 A1 | 9/2002 | Munson | |
| 2005/0071516 A1 | 3/2005 | Levine et al. | |
| 2005/0154861 A1 | 7/2005 | Arimilli | |
| 2006/0004986 A1 | 1/2006 | Sethuraman | |
| 2006/0174229 A1 | 8/2006 | Muser | |
| 2006/0225135 A1 | 10/2006 | Cheng et al. | |
| 2007/0074011 A1 | 3/2007 | Borkar | |
| 2008/0155339 A1 | 6/2008 | Lowe | |
| 2008/0282038 A1 | 11/2008 | Sethuraman | |
| 2009/0182994 A1 | 7/2009 | Bell | |
| 2009/0271867 A1 | 10/2009 | Zhang | |
| 2010/0306847 A1 | 12/2010 | Lambert et al. | |
| 2011/0016508 A1 | 1/2011 | Wallace | |
| 2011/0302395 A1 | 12/2011 | Hall | |
| 2012/0117610 A1 | 5/2012 | Pandya | |
| 2013/0205123 A1 | 8/2013 | Vorbach | |
| 2013/0205150 A1 | 8/2013 | Eastlack | |
| 2014/0281442 A1 | 9/2014 | O'Sullivan et al. | |
| 2015/0106604 A1 | 4/2015 | Greathouse et al. | |
| 2015/0350666 A1 | 12/2015 | Kovacevic | |
| 2016/0328239 A1 | 11/2016 | Iyer et al. | |
| 2017/0286110 A1 | 10/2017 | Agron | |
| 2018/0101477 A1 | 4/2018 | Kan | |
| 2018/0121333 A1 | 5/2018 | Richter | |
| 2018/0129629 A1 * | 5/2018 | Sadasivam | G06F 12/0875 |
| 2018/0165200 A1 | 6/2018 | Sethuraman | |

OTHER PUBLICATIONS

J. Dean, J. E. Hicks, C. A. Waldspurger, W. E. Weihl and G. Chrysos, "ProfileMe: hardware support for instruction-level profiling on out-of-order processors," Proceedings of 30th Annual International Symposium on Microarchitecture, 1997, pp. 292-302 (Year: 1997).*
W. Binder, M. Schoeberl, P. Moret and A. Villazòn, "Cross-Profiling for Embedded Java Processors," 2008 Fifth International Conference on Quantitative Evaluation of Systems, 2008, pp. 287-296 (Year: 2008).*
Intel Corporation, "Intel® Digital Random Number Generator (DRNG), Software Implementation Guide," Aug. 7, 2012, 35 pages.
U.S. Appl. No. 14/742,908, filed Jun. 18, 2015, entitled, "Providing Deterministic, Reproducible, And Random Sampling In A Processor," by Girish Venkatasubramanian, et al.
European Patent Office, Extended European Search Report dated May 8, 2018 in European Patent Application No. 17200468.1.
Silberman, et al., "An Architectural Framework for Supporting Heterogeneous Instruction-Set Architectures," IEEE Computer, vol. 26, Issue 6, pp. 39-56, Jun. 1993.
Ball, et al., "Optimally Profiling and Tracing Programs," ACM Transactions on Programming Languages and Systems, vol. 16, Issue 4, pp. 1319-1360, Jul. 1994.
Inoue, et al., "How A Java VM Can Get More from a Hardware Performance Monitor," Proceedings of the 24th ACM SIGPLAN Conference, pp. 137-154, Oct. 25-29, 2009.
Wagner, et al., "Accurate Static Estimators for Program Optimization," Proceedings of the ACM SIGPLAN 1994 Conference, pp. 85-96, Jun. 20-24, 1994.

* cited by examiner

SYSTEM, APPARATUS AND METHOD FOR DYNAMIC PROFILING IN A PROCESSOR

This application is a divisional of U.S. patent application Ser. No. 15/373,682, filed Dec. 9, 2016, the content of which is hereby incorporated by reference.

TECHNICAL FIELD

Embodiments relate to a processor and more particularly to a processor having profiling capabilities.

BACKGROUND

During a design process of a processor, dynamic profiling of instructions is traditionally used prior to a hardware design freeze for improving instruction set architecture (ISA) performance and/or improving software performance on a fixed ISA prior to a software design freeze. However, this approach suffers in that the optimal ISA performance is based on simulations that assume certain system behavior (memory accesses for instance) that could be different in reality. As such, optimal ISA performance is based on simulations that may not cover all possibilities that could occur in real life applications post hardware design freeze.

DETAILED DESCRIPTION

In various embodiments, techniques are provided for performing non-invasive dynamic profiling to enable a mechanism to improve ISA performance post hardware design freeze. The basic principle involves in situ profiling of instructions executed on a processor, in an intelligent manner. To this end, embodiments may track and keep count of the most used set of select instructions. Dynamic profiling of all instructions would be expensive in terms of area. Instead, embodiments may identify a subset of instructions based at least in part on static analysis of code during compile time, to identify potential candidate instructions suitable for dynamic profiling.

In turn, these potential candidate instructions may be profiled dynamically during runtime to identify a subset of these instructions that are most active. Hint information regarding these most active instructions of the potential candidate instructions may be provided to various resources of a processor to optimize performance. In a particular example, this hint information can be provided to an instruction caching structure to optimize storage and maintenance of these most used instructions within the caching structure. In this way, the performance penalty of cache miss for most active instructions can be reduced or avoided.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Figure 1:
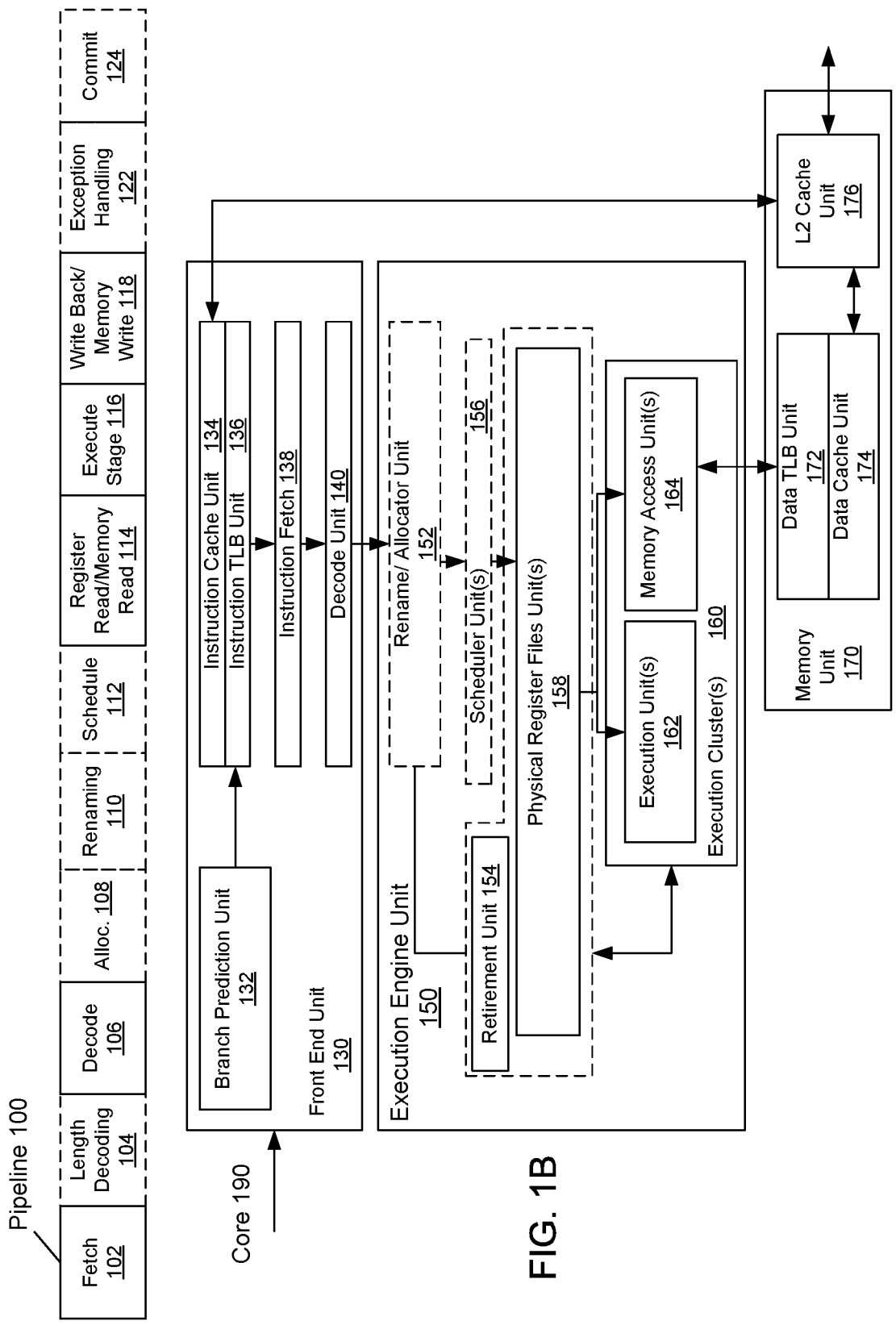
FIG. 1A is a block diagram of an exemplary in-order pipeline and an exemplary register renaming, out-of-order issue/execution pipeline to be included in a processor according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline to be included in a processor according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type.

As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) unit(s) 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector register unit, a write mask register unit, and a scalar register unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. Instruction cache unit 134 and data cache unit 174 may together be considered to be a distributed L1 cache. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 may be coupled to one or more other levels of cache and eventually to a main memory.

By way of example, the exemplary register renaming, out-of-order issue/execution core architecture may implement the pipeline 100 as follows: 1) the instruction fetch unit 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set developed by MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1)), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a L1 internal cache, or multiple levels of internal cache. In some embodiments, the system may include a combination of an internal cache and an external cache that is external to the core and/or the processor. Alternatively, all of the caches may be external to the core and/or the processor.

Figure 2:
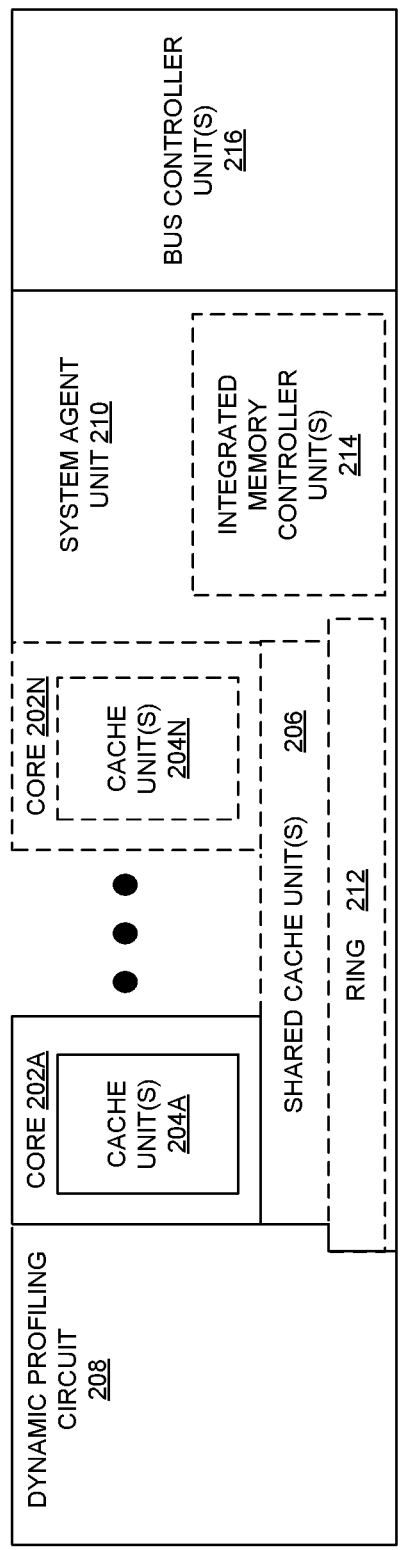
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent unit 210, a set of one or more bus controller units 216, while the optional addition of the dashed lined boxes illustrates an alternative processor 200 with multiple cores 202A-N, and a set of one or more integrated memory controller unit(s) 214 in the system agent unit 210. As further illustrated in FIG. 2, processor 200 also may include a dynamic profiling circuit 208, as described herein which may be leveraged by one or more of cores 202A-202N. In some cases, dynamic profiling circuit 208 may be controlled to be dynamically shared by multiple ones of these cores as will be described further herein.

Thus, different implementations of the processor 200 may include: 1) a CPU with special purpose logic being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache units 204A-204N (including L1 cache) within the cores, a set of one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects special purpose logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202A-N.

In some embodiments, one or more of the cores 202A-N are capable of multithreading. The system agent unit 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit may be for driving one or more externally connected displays.

The cores 202A-N may be homogenous or heterogeneous in terms of architecture instruction set; that is, two or more of the cores 202A-N may be capable of execution of the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, tablets, handheld PCs, personal digital assistants, engineering workstations, servers, network devices, network hubs, switches, embedded processors, digital signal processors (DSPs), graphics devices, video game devices, set-top boxes, micro controllers, cell phones, smartphones, portable media players, hand held devices, and various other electronic devices, are also suitable. In general, a huge variety of systems or electronic devices capable of incorporating a processor and/or other execution logic as disclosed herein are generally suitable.

Figure 3:
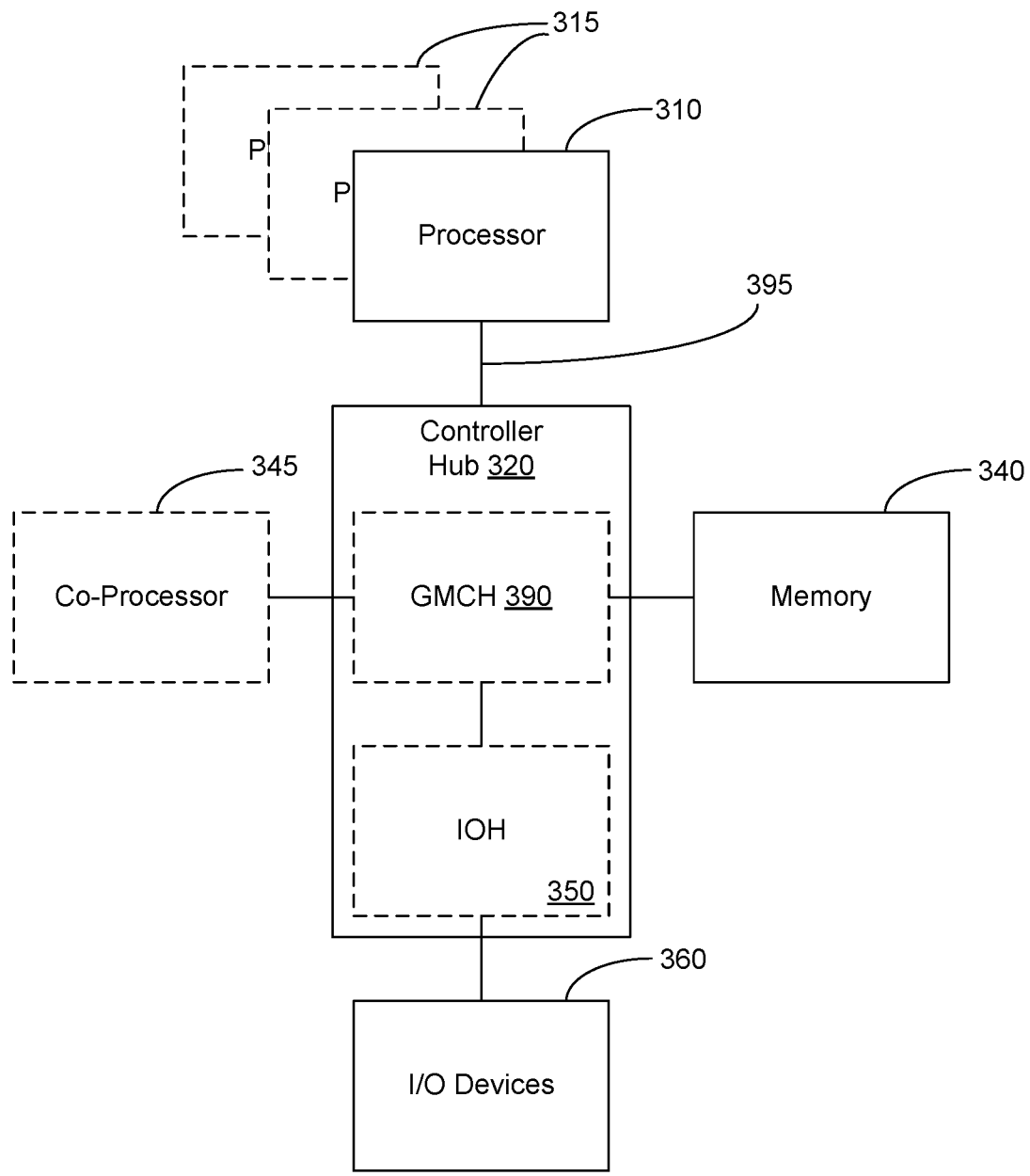
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (these may be on separate chips); the GMCH 390 includes memory and graphics controllers to which are coupled to a memory 340 and a coprocessor 345; the IOH 350 couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 is a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as an Intel® QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
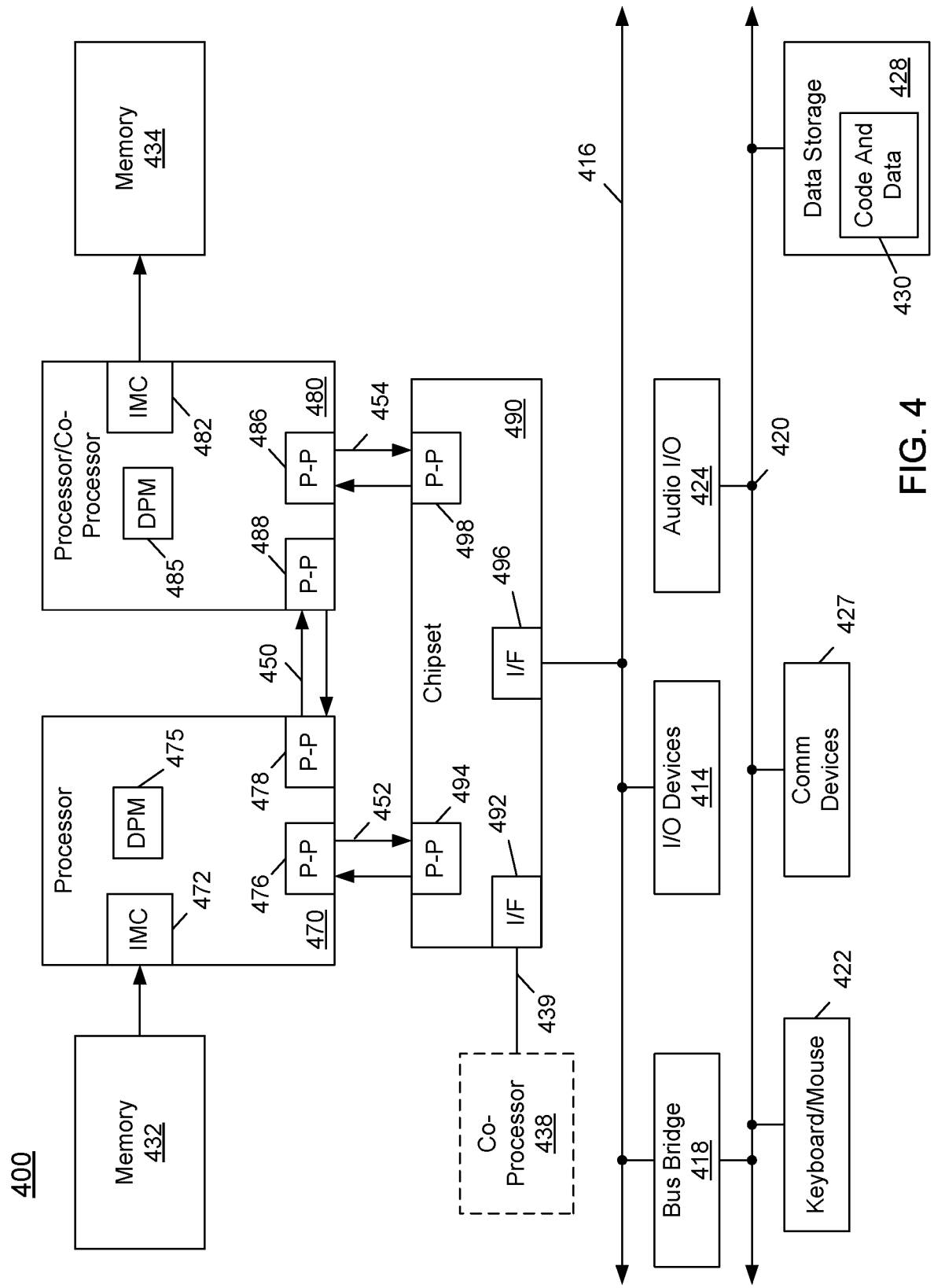
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200 of FIG. 2. In one embodiment, processors 470 and 480 are respectively processors 310 and 315, while coprocessor 438 is coprocessor 345. In another embodiment, processors 470 and 480 are respectively processor 310 and coprocessor 345.

Processors 470 and 480 are shown including integrated memory controller (IMC) units 472 and 482, respectively. In addition, processors 470 and 480 include a dynamic profiling module (DPM) 475 and 485 respectively, details of which are described further below. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439 using point-to-point interface circuit 492. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
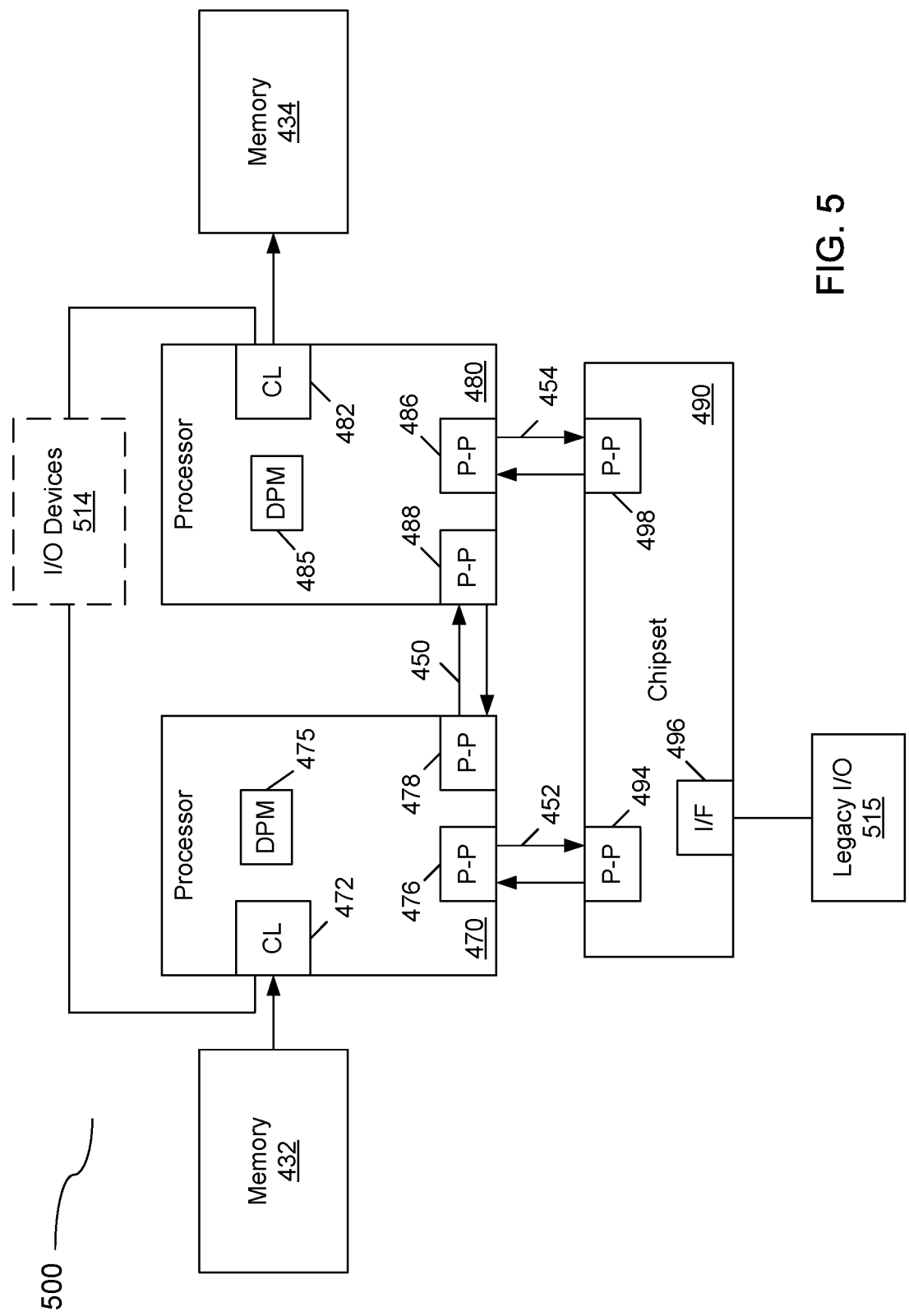
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. Processors 470, 480 further include a DPM 475, 485 respectively, details of which are described further below. FIG. 5 illustrates that not only are the memories 432, 434 coupled to the CL 472, 482, but also that I/O devices 514 are also coupled to the control logic 472, 482. Legacy I/O devices 515 may be coupled to the chipset 490.

Figure 6:
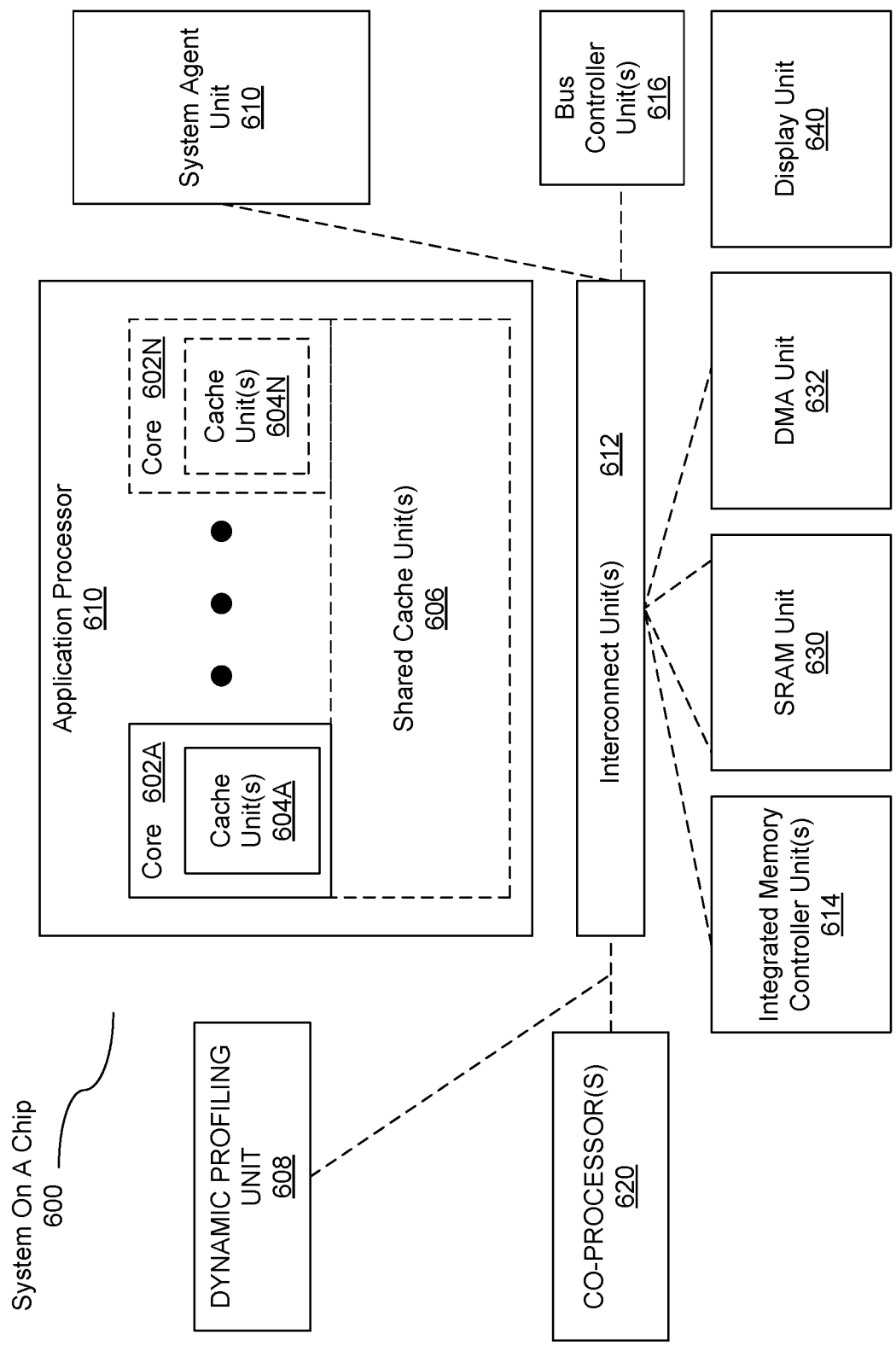
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Also, dashed lined boxes are optional features on more advanced SoCs. In FIG. 6, an interconnect unit(s) 612 is coupled to: an application processor 610 which includes a set of one or more cores 602A-N having cache unit(s) 604A-604N, and shared cache unit(s) 606; a dynamic profiling unit 608 which may be shared by multiple ones of cores 602A-602N as described herein; a system agent unit 610; a bus controller unit(s) 616; an integrated memory controller unit(s) 614; a set of one or more coprocessors 620 which may include integrated graphics logic, an image processor, an audio processor, and a video processor; a static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible non-transitory, machine readable medium and supplied to various customers or manufacturing facilities to load into the fabrication machines that actually make the logic or processor. Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
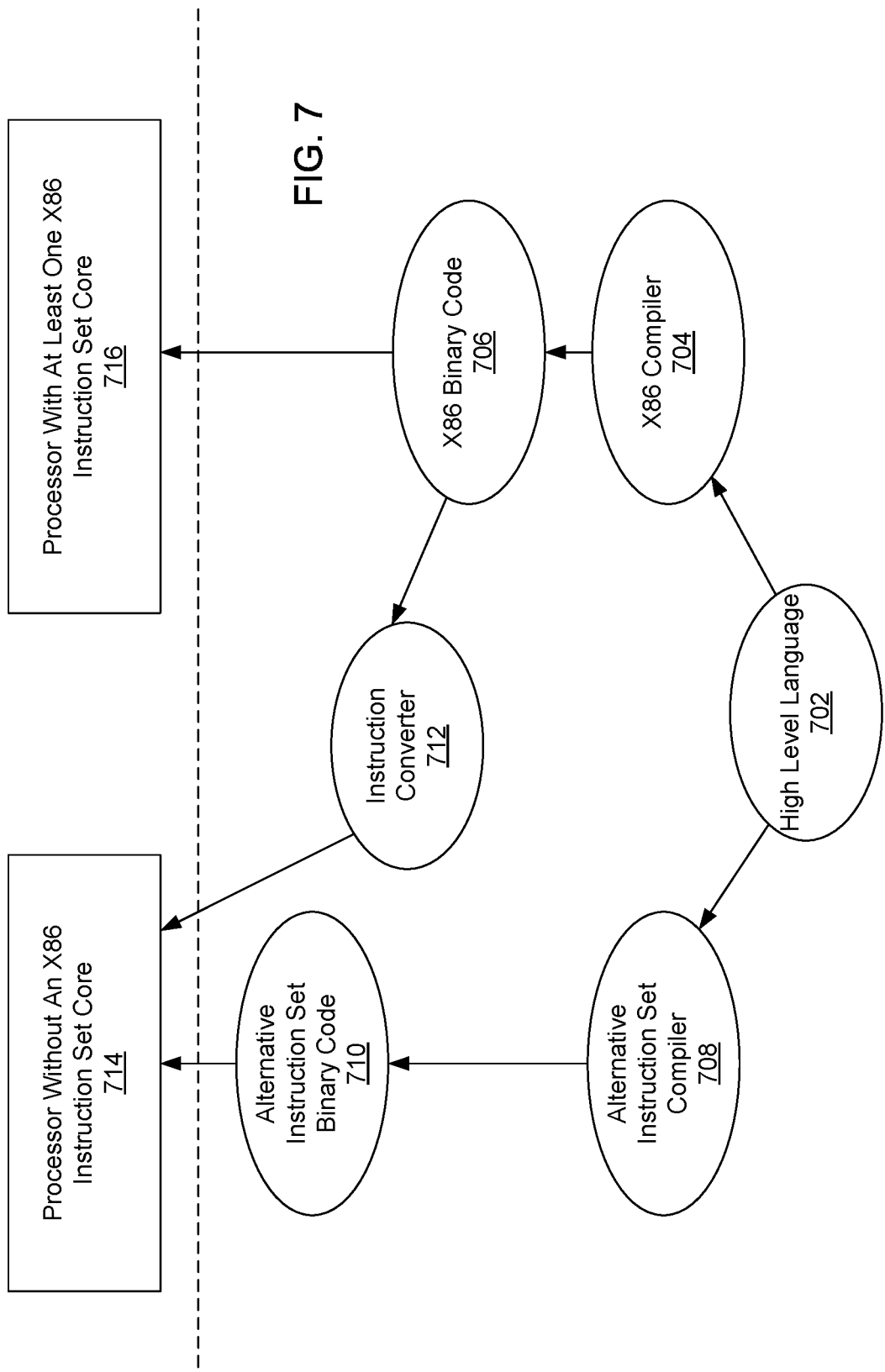
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel® x86 instruction set core or (2) object code versions of applications or other software targeted to run on an Intel processor with at least one x86 instruction set core, in order to achieve substantially the same result as an Intel® processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Figure 8:
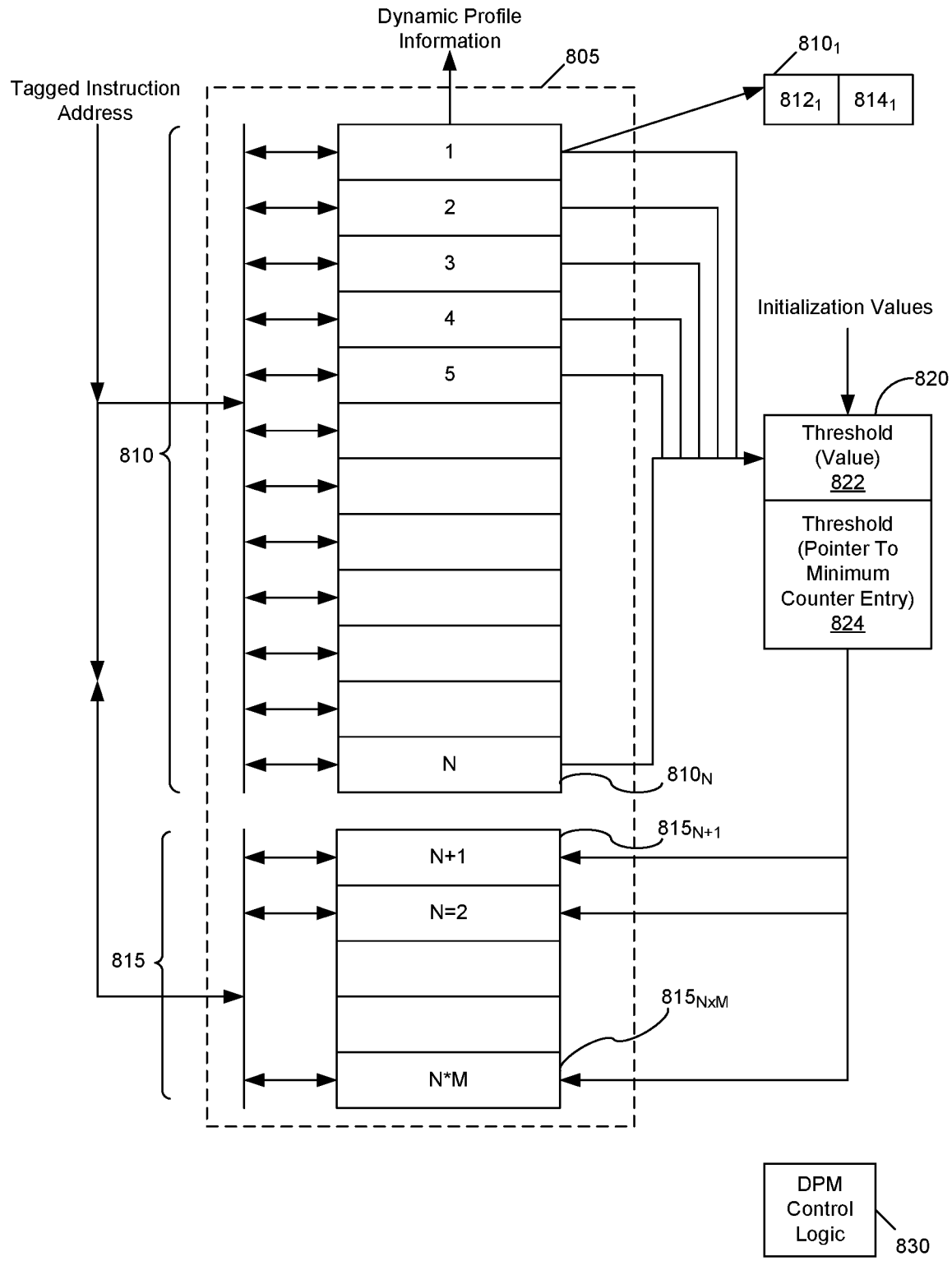
FIG. 8 is a block diagram of a dynamic profiling module in accordance with an embodiment of the present invention.

Referring now to FIG. 8, shown is a block diagram of a dynamic profiling module in accordance with an embodiment of the present invention. More specifically, dynamic profiling module (DPM) 800 is a representative profiling module that can be used to dynamically profile tagged instructions as described herein. In different embodiments, DPM 800 may be implemented as hardware circuitry, software and/or firmware, or combinations thereof. In some cases, DPM 800 may be dedicated hardware circuitry of a particular core of a single core or multicore processor. In other cases, DPM 800 may be implemented by logic that executes on one or more execution units of such core. In still further cases, DPM 800 may be implemented as a dedicated hardware unit separate from any cores of a multicore processor and as such, may be a dynamically reconfigurable hardware logic unit that can be reused by a set of cores of the processor as described herein.

In any event, FIG. 8 shows details of DPM 800. As illustrated, DPM 800 includes a storage 805. Storage 805 may be implemented as any type of memory structure including volatile and non-volatile memories. In the embodiment shown, storage 805 includes a first plurality of entries 810, namely entries $810_1$-$810_N$. As will be described herein, this subset of entries 810 may be used to store information regarding N instructions, namely the N most hot instructions being profiled within DPM 800. As used herein, the term "hot instruction" means an instruction that is often used, such as more than a threshold number of times and more so than at least some other instructions. As further seen in FIG. 8, a representative entry $810_1$ shown in the inset of FIG. 8 includes a comparator field $812_1$ and a corresponding count field $814_1$ to store a count value. Comparator field $812_1$ may be implemented to store address information of an instruction associated with the entry to determine whether incoming address information matches this stored address information, while count field $814_1$ is configured to store a count value corresponding to the number of executions of the given instruction. As further seen, storage 805 also includes a second plurality of entries 815. Specifically, this subset of entries ($815_{N+1}$-$815_{N \times M}$) may be used to store information regarding additional tagged instructions. More specifically, these tagged instructions may be less frequently used than the N hot instructions. As will be described herein, instructions may be dynamically swapped between these two sets of entries as given entries within subset 810 become less frequently used in favor of instructions from subset 815 that become more frequently used.

To aid in determination of the N hot instructions, a threshold storage 820 is present. As seen, threshold storage 820 may store at least one threshold value within a threshold register 822. In an embodiment, this threshold value may be a count equal to the count value of the least hot of the N hot entries. And a corresponding pointer to this entry may be stored in pointer storage 824. Understand that in other embodiments, multiple sets of these threshold registers may be provided to enable multiple segmentations of instructions. For example, with two sets of threshold registers, a first portion of the N hot registers can be identified corresponding to the X top used instructions and an N–X remainder of the top N hot instructions can be associated with a second portion of the N hot registers. Of course many additional sets of registers and possibilities exist in other embodiments.

As further illustrated, DPM 800 further includes a DPM control logic 830, which may be configured to perform dynamic swap operations relating to dynamically updating the threshold value(s) as the number of instructions executed varies over time. In an embodiment, DPM control logic 830 may be implemented as a finite state machine (FSM) although other embodiments, including hardware circuitry, software and/or firmware are possible. As will be described herein, DPM control logic 830 may be configured to perform control operations with regard to the various entries within storage 805, as well as to perform processing on the resulting count information to identify hot instructions and send hint information associated with one or more of these hot instructions to one or more consumers. Still further as discussed herein in embodiments in which DPM 800 is implemented as a standalone component of a processor, DPM control logic 830 also may be configured to perform arbitration between the various cores or other processors to enable DPM 800 to be dynamically shared as a shared resource by multiple cores or other processing elements of the processor. Understand while shown at this high level in the embodiment of FIG. 8, many variations and alternatives are possible.

Still with reference to FIG. 8, assuming N*M counters and comparators in hardware entries 810, 815 available for dynamic profiling, operation may begin with a software settable (initialization) threshold stored in threshold register 822 of threshold storage 820 to be used in a comparison to identify whether a tagged instruction is hot (where hot means that an instruction is more often used). By inclusion of the top N hot tagged instructions within entries 810, this threshold may be dynamically adapted (taking the minimum count of the top N hot tagged instructions if it is greater than the initialized threshold value). And tagged instructions that are not in the top N hot tagged instructions but having a higher count than the current threshold can unseat an existing top N hot tagged instruction. This mechanism maintains at any point in time the top N hot tagged instructions within entries 810. Embodiments may be scalable in multiples of top N hot tagged instructions. The dynamic profiling output for the top N hot tagged instructions (or multiple of N thereof) can be used to optimize processor performance. For example, in embodiments an instruction caching architecture may leverage this information as a hint to improve dynamically the ISA performance post hardware design freeze. Of course, other uses for the profiling information provided herein are contemplated, including future ISA extensions based on profile information and improving compiler optimization.

Threshold register 822 (which may include multiple registers) may be configured to hold the value of a threshold (set either by software or by a minimum count among the N top tagged instruction entries or multiples of N thereof), while pointer storage 824 may be configured to store the pointer to the entry of entries 810 having the minimum count. Comparator field 812 of each entry is used for comparing the incoming tagged instruction address with its entry address, and if there is a match then the counter value stored in count field 814 is incremented, e.g., by 1 for that entry. This update may also invoke a comparison of the count value with that of threshold value from the threshold register 822.

At initialization, the threshold value stored in threshold register 822 may be set to X (which is a software initialized value). In addition, all N*M entries 810, 815 are initialized to zero, both for tagged instruction address and count value. During operation, every tagged instruction address enters dynamic profiling module 800. If the tagged instruction address has not been profiled before, a new entry is created (e.g., in one of entries 815), and its corresponding counter is incremented and the count value is compared to the threshold value. Instead if the tagged instruction address is already being profiled through an entry in dynamic profiling module 800, that entry's corresponding counter is updated and the count value is compared to the threshold value. If any of the N top tagged instructions (or multiples of N thereof) have a minimum count value greater than the threshold (initialized to X at start by software), then threshold register(s) 822 are updated with the minimum count and pointer storage(s) 824 are updated to the entry that had minimum count. If any of non-N top tagged instructions has a count value greater than the threshold, then this initiates a swap operation in which this entry is swapped with the entry identified by pointer register 824 (namely the entry having the minimum count among N top tagged instructions). Also, threshold register(s) 822 are updated with the new minimum value.

Thus in an embodiment, there are two phases of operation in the dynamic profiling module per processor clock tick: phase 1, in which entry update is performed, which includes count update and comparison with a threshold post comparison of the incoming tagged instruction address with the address stored in the entry, and if the comparison returns a match, operation proceeds to phase 2. In phase 2, if any entry has a higher count than the threshold value, then a dynamic swap operation is performed. In an embodiment, the following operations may be performed in a dynamic swap: if the entry is not part of the N top tagged entries, then this entry is swapped with the entry indicated in pointer register 824 and the threshold value stored in threshold storage 822 is updated to the new minimum. If the entry is part of the N top tagged entries, then the entry with the minimum count among N top tagged entries will update the threshold registers (value and pointer, if needed).

In an embodiment, dynamic profiling module 800 may output, per processor clock tick, profiling information regarding the N top tagged instructions (or multiples of N). Of course hint information regarding fewer instructions may be sent instead per clock cycle. Understand that in different embodiments, dynamic profiling module 800 may be scalable in multiples of N. The minimum count value among N or multiples of N can be determined hierarchically. In an embodiment, the threshold value and pointer value stored in threshold storage 820 may be broadcast to N*M entries 810, 815 to enable the above determinations to occur.

Figure 9:
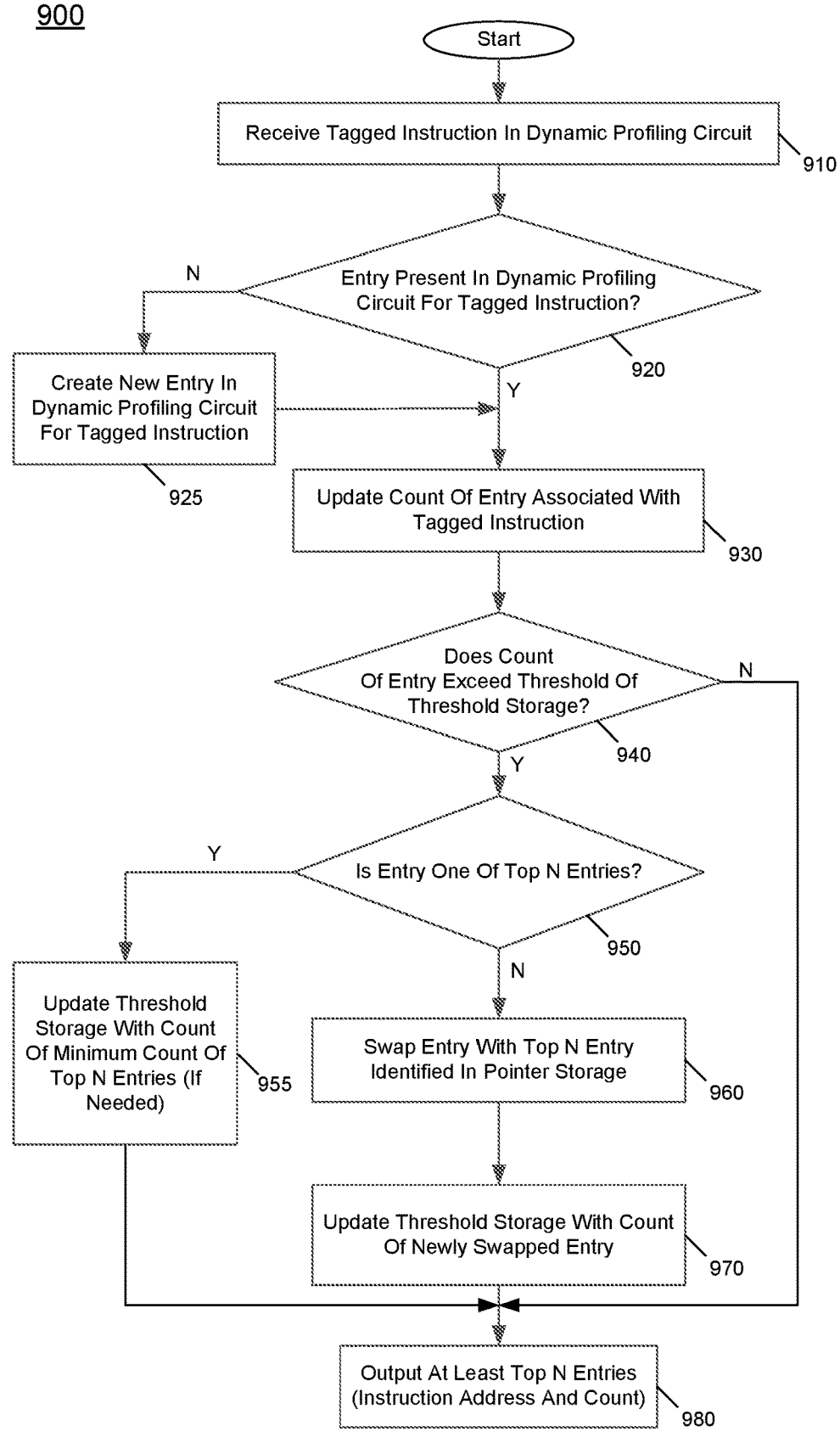
FIG. 9 is a flow diagram of a method in accordance with an embodiment of the present invention.

Referring now to FIG. 9, shown is a flow diagram of a method in accordance with an embodiment of the present invention. More specifically, method 900 shown in FIG. 9 may be performed by control logic of a DPM as described herein. As such, embodiments of method 900 may be performed by hardware circuitry, software and/or firmware. For example in different implementations, this control logic may be hardware circuitry implemented within a dedicated DPM. In other cases, method 900 may be executed within control logic of a core, such as dedicated logic or general-purpose circuitry. Of course many other embodiments are possible.

As illustrated, method 900 begins by receiving a tagged instruction in a dynamic profiling circuit (block 910). Note that the terms "dynamic profiling circuit" and "dynamic profiling module" are used interchangeably herein to refer to hardware circuitry, software, firmware and/or combinations thereof to perform the dynamic profiling described herein. As discussed above, this tagged instruction may be received as part of an instruction stream during execution of a given process on one or more cores of a processor. Next it is determined at diamond 920 whether an entry is present in the dynamic profiling circuit for this tagged instruction. In an embodiment, this determination as to whether an entry is present may be based on at least some portion of the address associated with the instruction, which may be used by each of the entries to perform a comparison to determine whether a match exists for a given entry within the DPM. This entry may be one of the N hot entries or may be one of the additional entries associated with less hot instructions. If no entry is present, a new entry may be created for this tagged instruction (block 925). Typically, this created entry will be within one of the less hot additional entries of the DPM. In some embodiments, when all of the entries include instruction information already, an eviction process first may be performed to remove, e.g., an entry associated with the least recently used instruction or a cleanup process may be routinely performed to remove tagged instructions if not active for a given (e.g., threshold) period of time or periodic reset of the DPM.

Still with reference to FIG. 9, from both of block 925 and diamond 920, control passes to block 930 where the count of the entry associated with the tagged instruction may be updated, e.g., by incrementing the count by one. Control next passes to diamond 940 to determine whether a count of the entry exceeds a threshold (which may be stored in a threshold storage of the DPM). If not, no further operations occur for this cycle with regard to this instruction entry. Accordingly, control passes to block 980 where instruction information associated with various entries of the DPM may be output. For example, instruction address information and count information for each of the top N entries (at least) may be output per cycle of execution. As will be described further herein, this information may be used to optimize execution.

Still with reference to FIG. 9 instead if it is determined that the count exceeds a given threshold, control passes to diamond 950 to determine whether the entry is one of the top N entries in the DPM. If so, control passes to block 955 where the threshold storage may be updated with a new threshold, namely a count of the minimum one of the top N entries. Note that in a given cycle, this threshold update operation may not be performed. Still with reference to FIG. 9, if instead it is determined that the entry is not one of the top N entries, control passes to block 960 where this entry may be swapped with the top N entry identified in the pointer storage. That is, as this entry under consideration now has a higher count than the least used entry within the top N entries, a dynamic swapping may be performed such that this entry under consideration is placed into the top N entries. And accordingly, at block 970 the threshold storage may be updated with the count of this newly swapped entry. Thereafter, control passes to block 980, discussed above for output of information associated with the top N entries.

Note that in embodiments herein, the DPM may be used during execution of code that has not been translated or instrumented (such as by a dynamic binary translator (DBT)), enabling applicability in a wide variety of situations, and without the overhead of translation time. Understand while shown at this high level in the embodiment of FIG. 9, many variations and alternatives are possible.

Embodiments may identify select (tagged) instructions in different ways. In some embodiments, static analysis of code may be performed, e.g., during compilation. As an example, for a loop of code the choice for tagged instructions could be the first and last instructions of the loop body, along with a conditional instruction that checks the loop iteration. In nested loop code, the choice for tagged instructions could be the first and last instructions of the top loop body, or first and last instructions at several levels of the nested loop body, depending on the total number of instructions at various levels of the nested loop body.

Note that for functions, macros and other similar programming constructs that lead to a fixed body of code tagged instructions can be identified similar to loop constructs. In some embodiments, all instructions that are part of a recursion can be tagged.

In some embodiments, instructions can be classified into three bins: tagged instructions; non-tagged instructions; and conditionally tagged instruction; as described further below. Tagging instructions during static analysis of compilation may enable reduced resource consumption of a dynamic profiling module, which may be resource constrained.

Referring to Table 1 below, shown is an example static analysis of code during a compilation process to identify instructions suitable for dynamic profiling. More specifically, the loop code of Table 1 shows that the choice for tagged instructions could be the first and last instructions of a loop body and the instruction that determines the loop iterator.

TABLE 1

```
for(n1 = 0; n1 <= 9; n1++) // Instruction that determines the loop iterator
is tagged
{
    n2 = n3*n4;        // This instruction is tagged
    n5 = n6−n7;
    // perform more actions
    n8 = n9+n10; // This instruction is tagged and linked
}
```

For the above example of Table 1, it is sufficient to tag the loop first and last instructions. Also, note that the last instruction is linked to the first instruction of the loop so that the complete range of address between first and last instructions can be determined. In addition, the instruction that determines the loop iterator is tagged.

Tables 2A-2C show examples of static analysis for nested loop code. As seen in the different examples of these Tables, the choice for tagged instructions could be the first and last instructions of the top loop body or first and last instructions at several levels of the nested loop body, depending on the total number of instructions at various levels of the nest loop body.

TABLE 2A

```
for(n1 = 0; n1 <= 9; n1++) // Instruction that determines the loop iterator
is tagged
{
    n2 = n3*n4;        // This instruction is tagged
    n5 = n6−n7;
    // perform few actions
    for(m1 = 0; m1 <= 7; m1++)
    {
        m2 = m3*m4;
        m5 = m6−m7;
        // perform few actions
        m8 = m9+m10;
    }
    n8 = n9+n10;        // This instruction is tagged and linked
}
```

For the above example of Table 2A, it is sufficient to tag the outer nested loop first and last instructions since the total nested loop instructions are not that many. And, the instruction that determines the outer loop iterator is also tagged.

TABLE 2B

```
for(n1 = 0; n1 <= 9; n1++) // Instruction that determines the loop iterator
is tagged
{
    n2 = n3*n4;        // This instruction is tagged
    n5 = n6−n7;
    // perform many actions
    for(m1 = 0; m1 <= 7; m1++) // Instruction that determines the loop
        iterator is tagged
```

TABLE 2B-continued

```
   {
      m2 = m3*m4;       // This instruction is tagged
      m5 = m6-m7;
      // perform many actions
      m8 = m9+m10;      // This instruction is tagged and linked
   }
   n8 = n9+n10; // This instruction is tagged and linked
}
```

For the above example of Table 2B, the outer and inner nested loop first and last instructions are tagged since the total nested loop instructions are many. And the outer and inner nested loop instructions that determine the loop iterations are tagged.

TABLE 2C

```
for(n1 = 0; n1 <= 9; n1++)
{
   n2 = n3*n4;
   n5 = n6-n7;
   // perform few actions
   for(m1 = 0; m1 <= 7; m1++)      // Instruction that determines the
   loop iterator is tagged
   {
      m2 = m3*m4;       // This instruction is tagged
      m5 = m6-m7;
      // perform very many actions
      m8 = m9+m10;  // This instruction is tagged and linked
   }
   n8 = n9+n10;
}
```

For the above example of Table 2C, the inner nested loop first and last instructions are tagged since the total inner nested loop instructions are very many. And the inner nested loop instruction that determines the loop iterator is tagged.

While shown with these representative examples for purposes of illustration, understand that embodiments are not so limited and other static-based analyses may be performed to identify instructions for tagging. Note also that in an embodiment, the number of resources available in hardware for dynamic profiling may be an input to the compiler to enable the compiler to select an appropriate subset of instructions for dynamic profiling adhering to hardware resource constraints.

As to binning instructions into three categories, note that tagged and non-tagged instructions can be determined during static analysis of compilation. Conditionally tagged instructions are those instructions that cannot be binned into tagged or non-tagged classification at compile time, since these instructions rely on run-time values in order to be considered either as tagged or non-tagged. In embodiments, these instructions may be classified as conditionally tagged instructions. Then during operation, run-time hardware may be configured to determine whether a conditionally tagged instruction should be tagged or not based on run-time value. For instance, a loop iterator instruction may be identified as a conditionally tagged instruction, in that a run-time variable of the instruction is one where a programmer has not provided pragmas to indicate the minimum value of the iterator. The run-time hardware may be configured to determine the value of the expression of iterator, and based on, e.g., a software settable threshold, this conditionally tagged instruction will be classified either as tagged or non-tagged. This hardware, based on the result of the execution of the iterator instruction, may flip the tag from "conditionally tagged" to "tagged" if the iterator value is higher than the threshold and "conditionally tagged" to "non-tagged" instruction if it is otherwise. In an embodiment, this hardware is located within the processor execution circuitry.

Table 3 below shows example code including a conditionally tagged instruction.

TABLE 3

```
x= y + z; // y and z are variables whose values are not known at
compile time
for(n1 = 0; n1 <= x; n1++) // Instruction that determines the loop
iterator is conditionally tagged
{
   n2 = n3*n4;       // This instruction is conditionally tagged
   n5 = n6-n7;
   // perform many actions
   n8 = n9+n10; // This instruction is conditionally tagged and
   linked
}
```

For the above example, since the value of x is not known at compile time, the instruction that determines the loop iterator is conditionally tagged. Also, the first and last instructions of the loop are conditionally tagged. And the last instruction is linked to the first instruction in the loop to enable identification of the complete range of addresses between first and last instructions.

Figure 10:
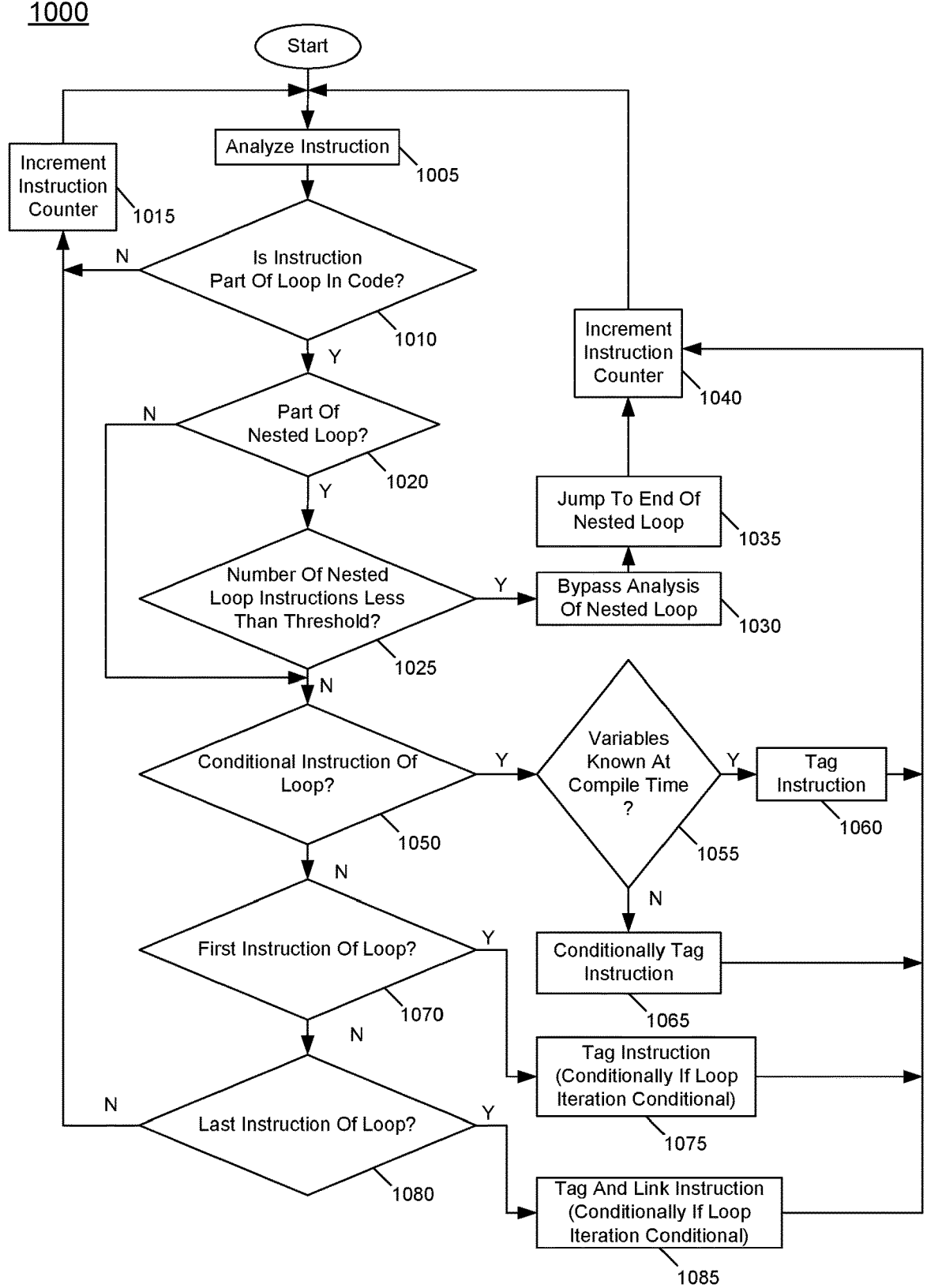
FIG. 10 is a flow diagram of a method in accordance with another embodiment of the present invention.

Referring now to FIG. 10, shown is a flow diagram of a method in accordance with another embodiment of the present invention. More specifically, as illustrated in FIG. 10, method 1000 may be performed to statically analyze program code to identify instructions to be tagged as discussed herein. In one embodiment, method 1000 may be performed by a compiler such as a static compiler that analyzes program code to be executed by a processor.

As illustrated, method 1000 begins by analyzing an incoming instruction (block 1005). Next it is determined whether this instruction is part of a loop within the code (diamond 1010). If not, no further analyses occurs for this instruction, and accordingly, an instruction counter for the analysis tool can be incremented (block 1015) to enable control to pass back to block 1005 for analysis of a next instruction. Note that while described in the context of method 1000 as considering whether an instruction is part of a loop, understand that this determination may also consider whether the instruction is part of a function or recursive code.

If it is determined that the instruction is part of a loop, control passes to diamond 1020 to determine whether it is part of a nested loop. If so, control passes next to diamond 1025 to determine whether the number of nested loop instructions within this nested loop is less than a nested loop threshold. Although the scope of the present invention is not limited in this regard, in one embodiment this nested loop threshold (which can be dynamically set in some cases) may be between approximately 5 and 10.

If it is determined that the number of nested loop instructions is less than this nested loop threshold, control passes to block 1030 where further analysis of this nested loop may be bypassed. As such, control jumps to the end of this nested loop (block 1035). Thereafter, the instruction counter may be incremented (block 1040) so that the next instruction can be analyzed (as discussed above at block 1005).

Still with reference to FIG. 10, it is determined whether the instruction is a conditional instruction of the loop (diamond 1050). If so, control passes to diamond 1055 to determine whether the variables associated with this conditional instruction are known at compile time. If so, control passes to block 1060 where the instruction may be identified as a tagged instruction. In an embodiment, a tag indicator may be associated with the instruction which, in an embodiment may be a single bit that is set (namely, to 1) to indicate that the instruction is a tagged instruction. Or two bits may be used to indicate that the instruction is a tagged instruction, and where the two bits can be used to cover the three possibilities, namely tagged (01), non-tagged (00) and conditionally tagged (10). After tagging the instruction, control passes to block 1040, discussed above to increment the instruction counter.

If instead it is determined that the one or more variables of the conditional instruction is not known at compile time (and thus are to be determined at run time), control passes to block 1065 where this instruction may be conditionally tagged. In an embodiment, an instruction can be conditionally tagged by setting a conditional tag indicator (single bit, namely 1) of the instruction or as stated above with two bits (10).

Still referring to FIG. 10, if the instruction is not identified as a conditional instruction, control passes to diamond 1070 to determine whether the instruction is the first instruction of the loop. If so, control passes to block 1075 where the instruction may be tagged. And if this first instruction is of a conditional loop, the instruction may be conditionally tagged. Finally, if the instruction is not identified as a first instruction of the loop, control passes to diamond 1080 to determine whether the instruction is the last instruction of the loop. If so, control passes to block 1085, where this last instruction may be tagged and linked to the first instruction. And if this last instruction is of a conditional loop, the instruction may be conditionally tagged. Understand while shown at this high level in the embodiment of FIG. 10, many variations and alternatives are possible.

In most cases, an N hot tagged instruction leads to a triplet of instructions that are linked representing a loop or nested loops. This triplet includes the loop iterator instruction, first instruction in the loop body and the last instruction in the loop body. Given the triplet, there can be many instructions within the loop body that are not tagged but can be derived from the triplet. As will be described further below, a hint information consumer such as a caching structure may use this triplet to determine whether a specific instruction is not tagged but within a loop body. If so, that specific instruction may also be handled as an N hot instruction, such as storage into a second instruction cache portion. This basically means that a triplet of tagged instructions representing a loop present in the N hot tagged instructions (as analyzed in the dynamic profiling module), can in fact lead to 3+L instructions that may be specially cached, where L is the total instructions in the loop body minus 3 (triplet). There are also cases where the N hot tagged instructions lead to a pair of instructions that are linked, such as representing a hard macro having start and end instructions. The same logic above as to triplets applies to instructions that are within the start/end instructions of the hard macro. There are also cases where an N hot tagged instruction leads to a single instruction that is linked to no other instruction, representing a recursion. By tagging only pair of instructions in the case of hard macros and triplet in the case of (nested) loops, the amount of dynamic profiling hardware is minimized.

As discussed above, a dynamic profiler as described herein may produce at every clock tick updated dynamic profile information that can potentially be used for caching instructions that are most often used. Embodiments may apply filtering to this information, e.g., by low pass filtering the dynamic profile information in order to avoid any high frequency changes to the profile information, which could be an outlier and can cause negative impact on instruction caching.

In one particular embodiment, a moving average filtering technique (or other low pass filter or boxcar filter) may be used to filter dynamic profile information. Such filtering may ensure that any spurious high frequency outliers are removed before providing the low pass filtered dynamic profile information as hint information, e.g., to an instruction caching structure. Coupling a low pass filter in the path between the dynamic profile module and a hint consumer such as an instruction caching structure may ensure that received hint information enhances ISA performance (e.g., enabling caching the most often used instructions).

Figure 11:
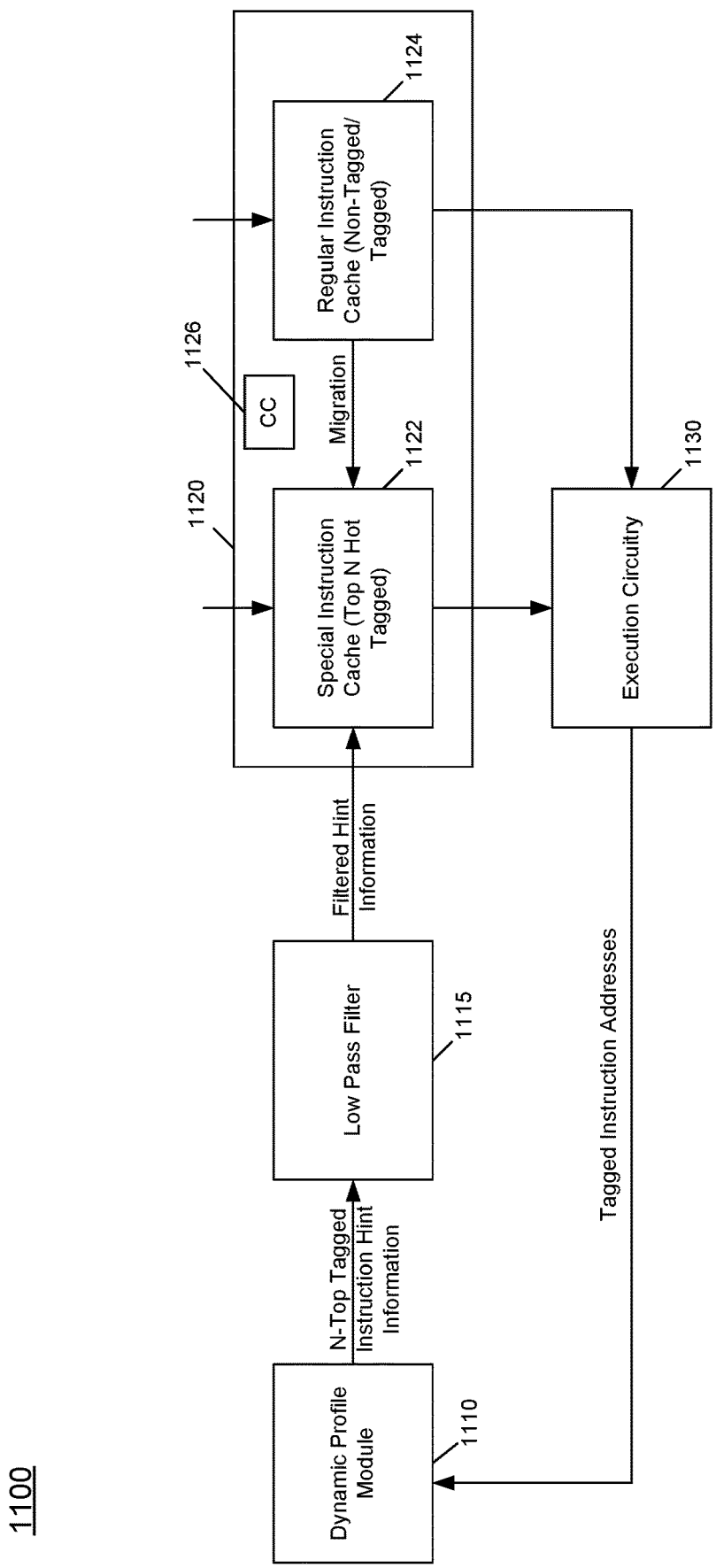
FIG. 11 is a block diagram of a processor in accordance with an embodiment of the present invention.

Referring now to FIG. 11, shown is a block diagram of a processor in accordance with an embodiment of the present invention. More specifically, processor 1100 may, in one embodiment, be a detail of a given core of a multicore processor in which at least some cores have dedicated DPM circuitry as described herein. Thus in the embodiment of FIG. 11, processor 1100 includes a dynamic profile module 1110 (which may be implemented similarly to DPM module 800 of FIG. 8). As seen, DPM 1110 may output hint information for N-top tagged instruction addresses, e.g., per execution cycle. In turn, this hint information is provided to a filter 1115, which in an embodiment may be implemented as a low pass filter. Low pass filter 1115 may filter this hint information to remove spurious effects. The resulting filtered hint information is provided to a cache structure 1120. In different embodiments, cache structure 1120 may be a given instruction cache.

Different types of cache memories and cache memory hierarchies are possible. However, for purposes of discussion herein, assume that cache memory 1120 includes a first portion 1122 and a second portion 1124, where first portion 1122 is a dedicated cache storage for the N hot instructions, and second cache portion 1124 is an instruction cache for non-tagged instructions and tagged instructions that are outside of the current N hot instructions. As further seen, in embodiments migrations of instructions between these two caches are possible such that when a given tagged instruction within cache portion 1124 is elevated to one of the top N hot instructions, that cache line may be migrated to first cache portion 1122 (and similarly, a least used instruction that is replaced by this new incoming instruction is demoted to second cache portion 1122). Understand that to perform these migrations and further to leverage the hint information, cache memory 1120 may include a cache controller 1126, which may perform these migrations of instructions between the two caches, as well as additional cache control functions.

As further illustrated in FIG. 11, processor 1100 further includes an execution circuit 1130, which may be implemented as one or more execution units to execute instructions received from cache memory 1120. Understand that while shown at this high level, many additional structures within a processor and core of a processor may be present in particular embodiments. However such structures are not shown for ease of illustration in FIG. 11.

Figure 12:
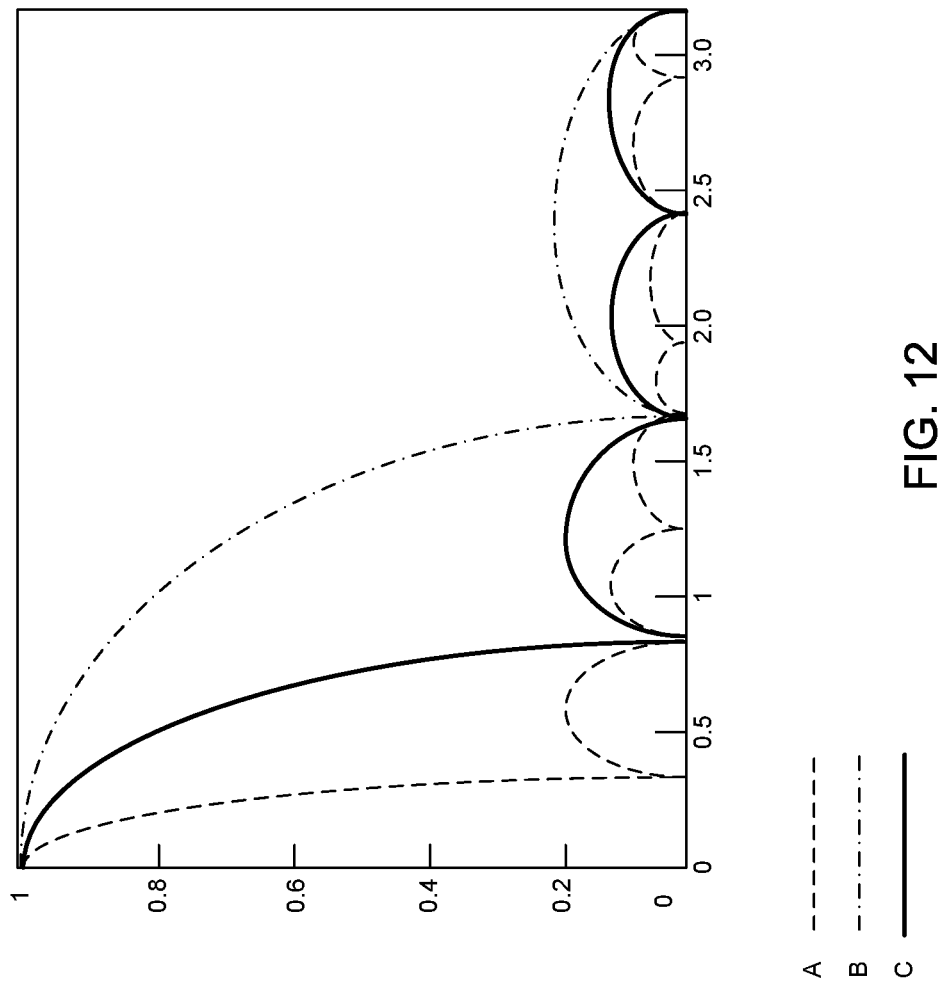
FIG. 12 is a graphical illustration of a frequency response of a moving average filter in accordance with an embodiment.

Referring to FIG. 12, shown is a graphical illustration of a frequency response of a moving average filter in accordance with an embodiment. The filter characteristics indicated in the graph relate to 4, 8 and 16 sample moving averages, as shown at curves A, B and C of illustration 1200, respectively. Notice that in all three cases, the frequency response has a low pass characteristic. A constant component (zero frequency) in the input passes through the filter un-attenuated. Note the boxcar filter attenuates from the zero frequency position for all three curves. Any spurious high frequency outliers in the dynamic profile information may be filtered using a filtering technique as described herein. In some embodiments filter 1115 may be configured as a plurality of independent filters. For example, with the assumption that hint information for each of the top N hot instructions is output from DPM 1110 per clock cycle, an independent moving average filter may be provided per corresponding count entry per instruction. In an embodiment, the filter may be configured such that if the output of a given moving filter differs from a current count for that entry, then the hint information for that instruction is not passed to a consumer (e.g., an instruction caching structure). However, if the moving average filter output matches with the current count for that entry, then the (positive) hint information for that instruction is passed to the instruction caching structure. In this way, if the instruction corresponding to a positive hint information is already identified as a top N hot instruction within the instruction cache (e.g., as located in a special instruction cache or in a locked way), then no action is taken. If however the instruction corresponding to the positive hint information is not present in the special instruction cache or way-locked cache, then that instruction is migrated from the regular cache or non-way locked location.

Embodiments may improve ISA performance dynamically via non-intrusive dynamic profiling as described herein at least in part by caching most often used instructions, and further maintaining these instructions such that they are not frequently evicted. As discussed above, non-intrusive dynamic profiling as described herein may provide information regarding: instructions that are most often used and not part of any (nested) loop body but can be part of a recursion body or hard macros; and instructions that are most often used and are part of a loop body. Based on linking information present in the last instruction of a loop body linking it to the first instruction of the loop, a complete range of addresses between first and last instructions that constitute a loop can be determined. This information may be used to appropriately store more active instructions for longer durations in an instruction cache. As such for the case of loop instructions, where the first and last instructions are identified as most often used, non-tagged instructions of the loop body between these first and last instructions may be stored and controlled the same as these first and last instructions. Similar logic can be applied to hard macros for which first and last instructions are identified as most often used.

In different embodiments, there may be multiple manners of implementing an instruction caching structure to leverage the profiling hint information described herein. In a first embodiment, one or more separate structures may be provided for most often used instructions. In this embodiment, all instructions are fetched into a first or regular instruction cache regardless of whether they are most often used instruction or not. Based on hint information from the dynamic profiling module, instructions that are most often used then may be cached in a second or special instruction cache. Specifically, the most often used instructions can be dynamically migrated from the regular instruction cache that is the receiver of fetched instructions to the special instruction cache. This approach ensures that the most often used instructions are not evicted in case there is a tsunami of sequential code execution that can potentially evict most often used instructions.

In another embodiment, instead of providing special and regular instruction cache arrays, a single cache memory array may be provided for all instructions, with different portions allocated or locked for the most often used instructions. In one example, a set associative cache memory may be arranged with certain ways locked for use only with the most often used instructions. Such ways may be controlled so that the instructions stored therein are evicted only based on hint information received from the dynamic profiling module (and not based on least recently used or other conventional cache eviction schemes). With this configuration, with certain ways allocated for most often used instructions, all instructions are fetched and inserted into non-locked ways. Based on hint information from the dynamic profiling module, the cache structure can migrate most often used instructions from the non-reserved ways to the reserved ways, thereby protecting the most often used instructions from a potential tsunami of sequential code execution. In either case, dynamic hint information from the dynamic profiling module may be used to identify which set of instructions to specially cache and protect them from eviction.

In yet other embodiments, a cache structure may include a separate storage for decoded instructions, referred to as a decoded instruction cache or decoded streaming buffer). Such separate storage may be used to store decoded instructions that are often used, so that front end units such as instruction fetch and decode stages can be bypassed. Embodiments may control a decoded instruction storage to only store N hot decoded instructions, to improve hit rate.

Figure 13:
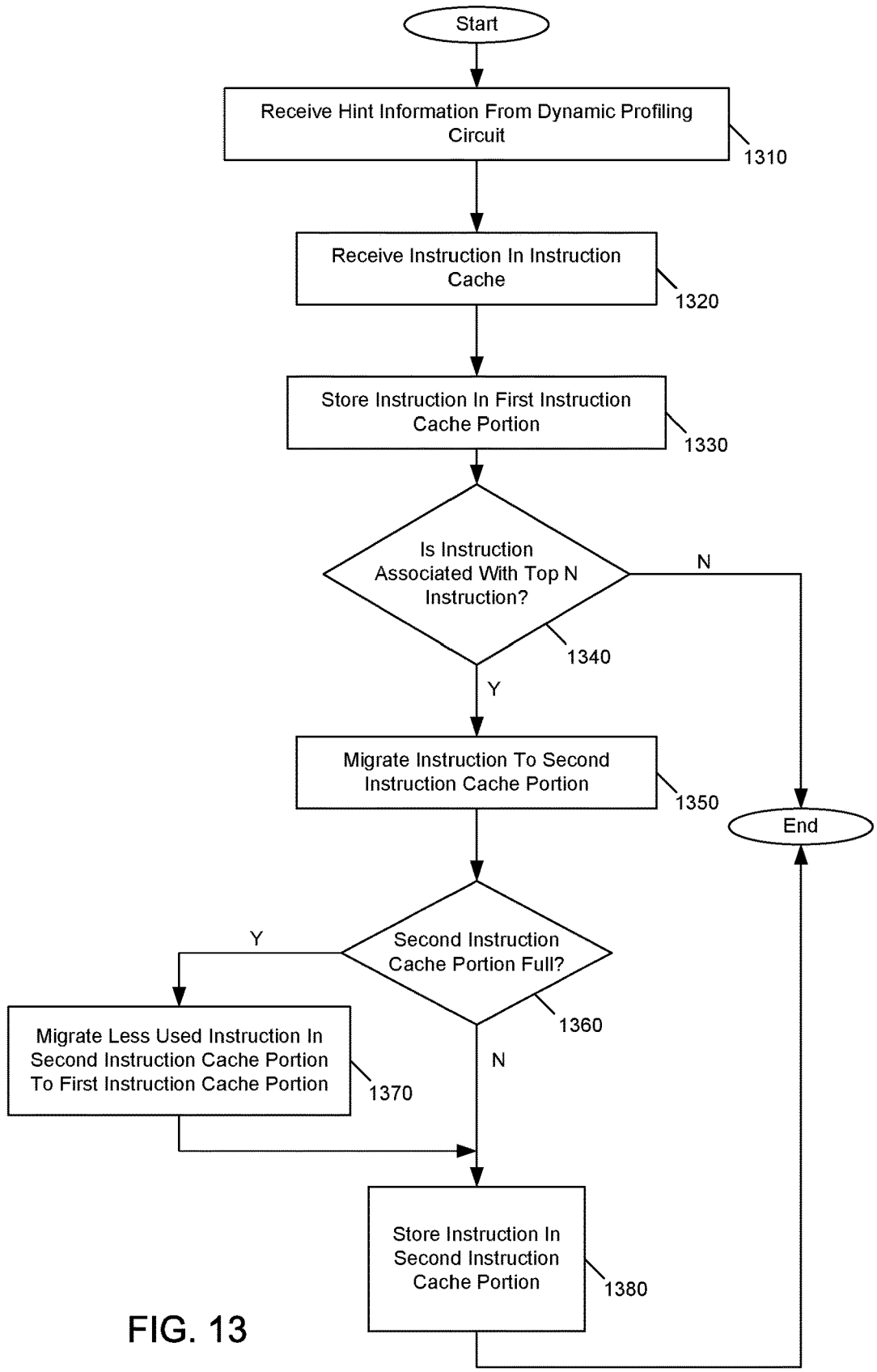
FIG. 13 is a flow diagram of a method in accordance with yet another embodiment of the present invention.

Eviction from the special instruction cache or locked way of an instruction cache is only when the cache is full, and new hint information (for a new hot instruction) arrives from the dynamic profiling module. In an embodiment, the size of the special instruction cache or the number of ways of an instruction cache locked for storing most often used instructions may be set at a maximum or multiples of N (where N is the top N hot tagged instructions). Understand that in other cases, the expense of a dynamic profiling module can be avoided by directly using compiler tagging to cache tagged instructions based on static analysis. However, in the interest of adding benefits of dynamic profiling, a potentially smaller sized cache may be used to ensure access to the most used instructions Referring now to FIG. 13, shown is a flow diagram of a method in accordance with yet another embodiment of the present invention. Method 1300 is a method for controlling storage of hot instructions within a cache memory such that they may be retained or more likely maintained within the cache memory to reduce performance and power consumption penalties of cache misses for such instructions. As shown in FIG. 13, method 1300 may be performed, e.g., by control logic of a caching structure. While in some embodiments, method 1300 may be performed by a cache controller of the cache memory, in other cases a dedicated tagged instruction manager of the cache memory may perform method 1300 (which in some cases may be a FSM or other control logic, e.g., implemented within the cache controller itself).

As illustrated, method 1300 begins by receiving hint information from a dynamic profiling circuit (block 1310). In an embodiment, this hint information may include address information and corresponding counts, e.g., of the top N instructions, to thus identify to the cache memory the most active instructions. Next, control passes to block 1320 where an instruction is received in the instruction cache. For example, this instruction may be received as a result of an instruction fetch, prefetch or so forth. Note that the ordering of blocks 1310 and 1320 may be flipped in certain cases.

In any event, control passes to block 1330 where this instruction is stored in a first instruction cache portion. That is, in embodiments described herein a caching structure that is to leverage the hint information can be controlled to provide different portions associated with tagged and non-tagged instructions. For example, different memory arrays may be provided for, at least, the top N hot instructions. In other examples, these separate cache portions may be implemented as certain dedicated ways of sets of the cache memory only for storage of tagged instructions.

In any event, at block 1330 this instruction is stored in a first cache portion, where this first cache portion is associated with non-tagged instructions. Next, control passes to diamond 1340 to determine whether this instruction is associated with a top N instruction. This determination may be based on comparison of address information of this instruction to address information of the hint information. Note that if the instruction itself is one of the top N hot instructions, a match occurs. In other cases, this determination can be based on determining that the instruction, although not tagged itself, is within a loop associated with tagged instructions.

If it is determined that this instruction is not associated with a top N instruction, no further operations occur with regard to this instruction within the cache and thus this instruction remains in the first instruction cache portion. Otherwise, if it is determined that this instruction is associated with a top N instruction, control passes to block 1350 where the instruction may be migrated to a second instruction cache portion. As described above, this second cache portion may be a separate memory array dedicated for hot instructions or a given way of a set dedicated to such hot instructions. As part of this migration it may be determined whether this second instruction cache portion is full (diamond 1360). If so, control passes to block 1370 where a less used instruction is migrated from this second cache portion to the first instruction cache portion. From both of diamond 1360 and block 1370, control passes to block 1380 where the instruction is stored in the second instruction cache portion. Understand while shown at this high level in the embodiment of FIG. 13, many variations and alternatives are possible.

As discussed above in some cases, a dynamic profiling module may be provided within or associated with each core of a multicore processor. In other cases, such circuitry can be shared for use by multiple cores or other processing engines, to provide a solution for efficient dynamic profiling infrastructure.

With one or more shared dynamic profiling modules as described herein, each core, when it employs the dynamic profiling infrastructure, will reach a steady state, e.g., with respect to benefiting from increased instruction cache hit rate based on the hint information provided by the dynamic profiling infrastructure. In embodiments, this steady state can be used as a trigger condition to either turn off the dynamic profiling module or switch use of the dynamic profiling infrastructure to another core or other processing engine of the SoC or other processor. Since the dynamic profiling infrastructure is independent of the processor architecture, it can be seamlessly used as dynamic profiling infrastructure for any processor architecture. In this way homogenous and heterogeneous processor architectures may benefit by efficient reuse with regard to a dynamic profiling infrastructure.

In an embodiment, a core, when it has an instruction cache hit rate that falls below a certain threshold, may be configured to issue a request to use the shared dynamic profiling infrastructure. To this end, a request queue may be provided to store these requests. In turn, the dynamic profiling infrastructure may access this request queue (which may be present in a control logic of the DPM, in an embodiment) to identify a given core or other processing element to select for servicing. In some embodiments, a priority technique may be used in which a core can issue a request with a given priority level based on a level of its instruction cache hit rate. And in turn, the shared dynamic profiling infrastructure may include priority determination logic (e.g., within the DPM control logic) to choose an appropriate core (or other processor) for use of the infrastructure based at least in part on the priority levels.

Figure 14:
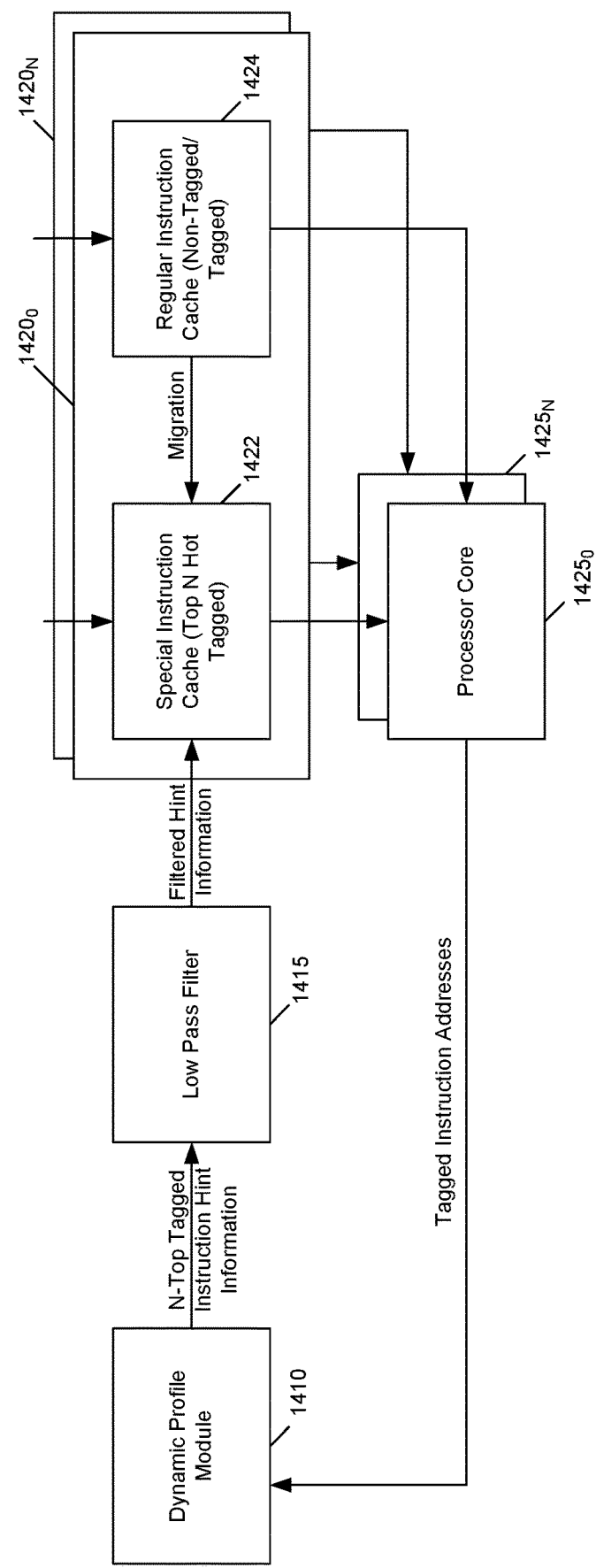
FIG. 14 is a block diagram of a multicore processor in accordance with an embodiment of the present invention.

Referring now to FIG. 14, shown is a block diagram of a multicore processor in accordance with an embodiment of the present invention. More specifically, processor 1400 includes a plurality of processor cores $1425_0$-$1425_N$. In different implementations, these cores may be homogeneous cores or heterogeneous cores or a mix of cores having different ISA capabilities, power consumption levels, microarchitectures and so forth. As further illustrated in FIG. 14, each core 1425 is associated with a corresponding caching structure $1420_0$-$1420_N$. While shown separately from the processor cores for ease of illustration, understand that in various embodiments caching structures 1420, which may be instruction caches as described herein, may be present within processor cores 1425. In other aspects, the arrangement of processor 1400 further including at least one dynamic profile module 1410 and a corresponding low pass filter 1415 may be similar to the arrangement described above in FIG. 11. Understand while shown with these limited components within the multicore processor, many more components, including accelerators, which also may leverage the dynamic profiling module, a power controller, memory control circuitry, graphics circuitry and so forth also may be present. And in some cases, multiple dynamic profiling modules may be present.

As further illustrated in FIG. 14, to enable reuse of the dynamic profiling infrastructure as described herein, embodiments may locate dynamic profiling module 1410 (and filter 1415) external to one or more processor cores 1425 of multicore processor 1400, which may leverage use of this common circuitry. In different embodiments, multiple cores may share dynamic profiling module 1410 at the same time, e.g., by allocating certain entries for use by particular cores. In other embodiments, sharing of the dynamic profiling infrastructure may occur in a time multiplexed manner, such that a single core is allowed to access this infrastructure at any given time period. Although the scope of the present invention is not limited in this regard, in one embodiment a core may be allowed to access the dynamic profiling infrastructure until it reaches a steady state of operation, such as where its instruction cache is generally fully populated and a relatively low instruction cache miss rate occurs. In example embodiments, this steady state operation may correspond to an instruction cache miss rate of between approximately 5 and 10%. In another embodiment, a core may send a request signal to request use of the dynamic profiling infrastructure when its instruction cache miss rate goes above a given threshold percentage, e.g., 20%. Of course in other cases other sharing techniques, such as a round robin approach or a priority-based approach (e.g., based at least in part on instruction cache miss rate), among other techniques are possible.

Figure 15:
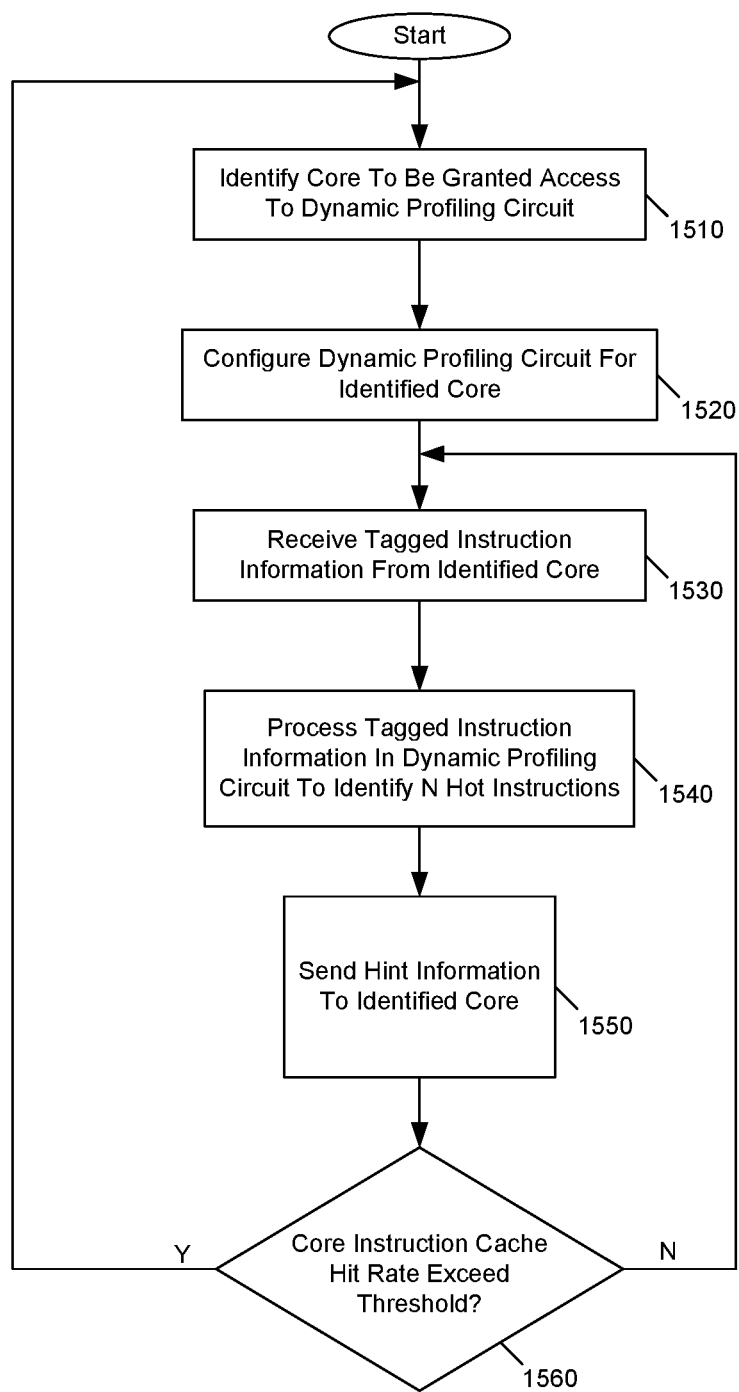
FIG. 15 is a flow diagram of a method in accordance with a still further embodiment of the present invention.

Referring now to FIG. 15, shown is a flow diagram of a method in accordance with a still further embodiment of the present invention. As shown in FIG. 15, method 1500 may be used by control logic of a multicore processor to arbitrate access to a dynamic profiling circuit as described herein. As an example, this control logic may be implemented within the dynamic profiling circuit itself. In other cases, a resource controller may be used to arbitrate access to a dynamic profiling module. As illustrated, method 1500 begins by identifying a core to be granted access to the dynamic profiling circuit (block 1510). As described above, different manners of arbitrating access may include a time multiplexed manner, a priority basis such as according to instruction cache miss rate, or so forth.

Control next passes to block 1520 where the dynamic profiling circuit can be configured for the identified core. For example, this configuration may include dynamically controlling switching of the dynamic profiling circuit to the given core to enable communication of hint information to the core from the dynamic profiling circuit, as well as to provide an instruction stream which includes address (with links in the case of (nested) loops and hard macros) from the core to the dynamic profiling circuit.

Still with reference to FIG. 15, next tagged instruction information may be received from the identified core (block 1530). That is, an instruction stream of tagged instructions may be received from the identified core. Understand that in other cases, all instructions may be provided and the dynamic profiling circuit can parse out non-tagged instructions. However efficiency may be improved by only sending tagged instructions to the DPM. Next at block 1540 the dynamic profiling circuit can process the tagged instruction information (such as discussed above with regard to FIG. 9) to identify the top N hot instructions that are undergoing execution within the core. Based on such processing, hint information is provided to the identified core (block 1550).

As a core begins to run in steady state while leveraging hint information as described herein to dynamically control its instruction cache memory, its instruction cache hit rate may increase over time. Thus as illustrated, at diamond 1560 it can be determined whether this instruction cache hit rate exceeds a given hit rate threshold. Although the scope of the present invention is not limited in this regard, in an embodiment this hit rate threshold may be between approximately 90 and 95%. If the core instruction cache hit rate does not exceed this hit rate threshold, this is an indication that execution of the program on the core has not reached steady state. As such, additional use of the dynamic profiling circuit to generate hint information for the identified core may continue at block 1530. Otherwise if it is determined that the instruction cache hit rate for the core exceeds the hit rate threshold, this is an indication that the dynamic profiling circuit can be used by another core, e.g., according to a given arbitration policy. Understand while shown at this high level in the embodiment of FIG. 15, many variations and alternatives are possible.

The following examples pertain to further embodiments.

In one embodiment, a processor includes: a storage having a plurality of entries each to store address information of an instruction and a count value of a number of executions of the instruction during execution of code including the instruction; and at least one comparator circuit to compare a count value from one of the plurality of entries to a threshold value, where the instruction comprises a tagged instruction of the code, the tagged instruction tagged by a static compiler prior to execution of the code.

In an example, the processor further comprises a control circuit to output hint information to identify at least one instruction associated with at least one of the plurality of entries having a count value greater than the threshold value.

In an example, the processor further comprises a threshold storage to store the threshold value, where the threshold value is to be dynamically updated based on a minimum count value of a first set of the plurality of entries.

In an example, the processor further comprises a dynamic profile circuit including the storage and the control circuit.

In an example, the processor further comprises a cache memory coupled to the dynamic profile circuit to receive the hint information, the cache memory including a cache controller to control eviction of a cache line of the cache memory based at least in part on the hint information.

In an example, the cache memory includes a plurality of ways, where a first subset of the plurality of ways are to be reserved for at least a subset of tagged instructions of the code.

In an example, the cache memory includes a first storage array to store at least non-tagged instructions and a second storage array to store at least a subset of tagged instructions.

In an example, the processor comprises a multicore processor having a plurality of cores, where the dynamic profile circuit comprises a separate circuit of the multicore processor to be dynamically shared by at least some of the plurality of cores.

In an example, the storage includes N×M entries, and where the control circuit is to store information associated with N most frequently accessed tagged instructions of the code in a first subset of the N×M entries.

In an example, the control circuit is to output the hint information associated with the N most frequently accessed tagged instructions.

In another example, a method comprises: determining whether an instruction to be executed in a processor is a part of a code loop; and responsive to determining that the instruction is part of the code loop, tagging the instruction to enable the instruction to be profiled in a dynamic profiler of the processor during execution of the code loop on at least one core of the processor.

In an example, the method further comprises analyzing the instruction via a static compiler to determine whether the instruction is part of the code loop.

In an example, the code loop comprises one of a function and recursive code.

In an example, the method further comprises: determining that the instruction is part of a nested loop; and not tagging the instruction if a number of instructions of the nested loop is less than a first threshold.

In an example, the method further comprises conditionally tagging the instruction if one or more variables of the instruction is not known at compile time, the instruction comprising a conditional instruction of the code loop.

In an example, the method further comprises tagging the instruction and linking the instruction to another instruction of the code loop, where the instruction is a last instruction of the code loop.

In another example, a method comprises: storing an instruction in a first portion of an instruction cache associated with a core of a processor; receiving, in a controller associated with the instruction cache, hint information from a dynamic profiling circuit of the processor; determining whether the instruction is associated with at least some of the hint information; and responsive to determining that the instruction is associated with the at least some of the hint information, migrating the instruction from the first portion of the instruction cache to a second portion of the instruction cache.

In an example, the method further comprises preventing the instruction from eviction from the second portion of the instruction cache until the instruction is not associated with the at least some of the hint information received from the dynamic profiling circuit.

In an example, the second portion of the instruction cache comprises a dedicated memory array for storage of often accessed instructions.

In an example, the first portion of the instruction cache comprises a first plurality of ways of the instruction cache and the second portion of the instruction cache comprises a second plurality of ways of the instruction cache, the second plurality of ways locked for storage of instructions associated with the hint information.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, an apparatus comprises: storage means having a plurality of entries for storing address information of an instruction and a count value of a number of executions of the instruction during execution of code including the instruction; and comparison means for comparing a count value from one of the plurality of entries to a threshold value, where the instruction comprises a tagged instruction of the code, the tagged instruction tagged by a static compiler prior to execution of the code.

In an example, the apparatus further comprises control means for outputting hint information to identify at least one instruction associated with at least one of the plurality of entries having a count value greater than the threshold value.

In an example, the apparatus further comprises threshold storage means for storing the threshold value, where the threshold value is to be dynamically updated based on a minimum count value of a first set of the plurality of entries.

In an example, the apparatus further comprises cache means for receiving the hint information, the cache means including a cache control means for evicting a cache line of the cache means based at least in part on the hint information.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
storing an instruction in a first portion of an instruction cache associated with a core of a processor;
receiving, in a controller associated with the instruction cache, hint information from a dynamic profiling circuit of the processor;
determining whether the instruction is associated with at least some of the hint information; and
responsive to determining that the instruction is associated with the at least some of the hint information, migrating the instruction from the first portion of the instruction cache to a second portion of the instruction cache.

2. The method of claim 1, further comprising preventing the instruction from eviction from the second portion of the instruction cache until the instruction is not associated with the at least some of the hint information received from the dynamic profiling circuit.

3. The method of claim 1, further comprising storing often accessed instructions in the second portion of the instruction cache, the second portion comprising a dedicated memory array, the instruction included in an address range between a first instruction and a second instruction, the hint information for at least one of the first instruction and the second instruction.

4. The method of claim 1, wherein the first portion of the instruction cache comprises a first plurality of ways of the instruction cache and the second portion of the instruction cache comprises a second plurality of ways of the instruction cache, wherein the method further comprises locking the second plurality of ways for storage of instructions associated with the hint information.

5. The method of claim 1, further comprising migrating a second instruction from the second portion of the instruction cache to the first portion of the instruction cache before migrating the instruction to the second portion of the instruction cache.

6. The method of claim 5, further comprising migrating the second instruction when the second portion of the instruction cache is full.

7. The method of claim 1, further comprising receiving the hint information comprising address information and count information for a plurality of instructions, the plurality of instructions of a set of most active instructions.

8. An apparatus comprising:
at least one core; and
a cache memory coupled to the at least one core comprising:
a first portion to store instructions;
a second portion to store instructions; and
a cache controller coupled to the first portion and the second portion, wherein the cache controller is to:
in response to hint information associated with an instruction, the hint information received from a dynamic profiling circuit, migrate the instruction from the first portion of the cache memory to the second portion of the cache memory, to cause the instruction be maintained in the cache memory for a longer duration.

9. The apparatus of claim 8, wherein the cache controller is to prevent the instruction from eviction from the second portion of the cache memory until the instruction is not associated with the at least some of the hint information received from the dynamic profiling circuit.

10. The apparatus of claim 8, wherein the cache controller is to store often accessed instructions in the second portion of the cache memory, the second portion comprising a dedicated memory array, the instruction included in an address range between a first instruction and a second instruction, the hint information for at least one of the first instruction and the second instruction.

11. The apparatus of claim 8, wherein the second portion of the cache memory comprises a second plurality of ways, and the cache controller is to lock the second plurality of ways for storage of instructions associated with the hint information.

12. The apparatus of claim 8, wherein the cache controller is to migrate a second instruction from the second portion of the cache memory to the first portion of the cache memory before the instruction is migrated to the second portion of the cache memory.

13. The apparatus of claim 12, wherein the cache controller is to migrate the second instruction when the second portion of the cache memory is full.

14. The apparatus of claim 8, further comprising:
the dynamic profiling circuit to output the hint information comprising a plurality of tagged instruction addresses per execution cycle; and
a filter coupled to the dynamic profiling circuit, wherein the filter is to provide filtered hint information to the cache controller.

15. A machine-readable medium having stored thereon instructions, which if performed by a machine cause the machine to perform a method comprising:
storing an instruction in a first portion of an instruction cache associated with a core of a processor;
receiving, in a controller associated with the instruction cache, hint information from a dynamic profiling circuit of the processor;
determining whether the instruction is associated with at least some of the hint information; and
responsive to determining that the instruction is associated with the at least some of the hint information, migrating the instruction from the first portion of the instruction cache to a second portion of the instruction cache.

16. The machine-readable medium of claim 15, wherein the method further comprises preventing the instruction from eviction from the second portion of the instruction cache until the instruction is not associated with the at least some of the hint information received from the dynamic profiling circuit.

17. The machine-readable medium of claim 15, wherein the method further comprises storing often accessed instructions in the second portion of the instruction cache, the second portion comprising a dedicated memory array.

18. The machine-readable medium of claim 15, wherein the first portion of the instruction cache comprises a first plurality of ways of the instruction cache and the second portion of the instruction cache comprises a second plurality of ways of the instruction cache, wherein the method further comprises locking the second plurality of ways for storage of instructions associated with the hint information.

19. The machine-readable medium of claim 15, wherein the method further comprises migrating a second instruction from the second portion of the instruction cache to the first portion of the instruction cache before migrating the instruction to the second portion of the instruction cache.

20. The machine-readable medium of claim 19, wherein the method further comprises migrating the second instruction when the second portion of the instruction cache is full.

* * * * *